United States Patent
Miyakoshi et al.

(10) Patent No.: US 6,724,300 B2
(45) Date of Patent: Apr. 20, 2004

(54) ALARM DEVICE AND RUNNING CONTROL APPARATUS INCLUDING THE ALARM DEVICE

(75) Inventors: Hironori Miyakoshi, Seto (JP); Nobuyuki Furui, Nisshin (JP); Haruyuki Kodera, Toyota (JP); Hiroyuki Satake, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/927,490

(22) Filed: Aug. 13, 2001

(65) Prior Publication Data

US 2002/0044047 A1 Apr. 18, 2002

(30) Foreign Application Priority Data

Aug. 29, 2000 (JP) .......................................... 2000-258971

(51) Int. Cl.⁷ ................................................ B60Q 1/00
(52) U.S. Cl. ...................... 340/435; 340/436; 340/438; 701/70; 180/167; 180/282
(58) Field of Search ................................ 340/435, 903, 340/936, 436, 438; 701/70, 96; 348/135, 148; 342/118; 364/426.04, 421; 180/167, 169, 282, 171

(56) References Cited

U.S. PATENT DOCUMENTS

| | | | | |
|---|---|---|---|---|
| 5,189,619 A | * | 2/1993 | Adachi et al. | 364/426.04 |
| 5,278,764 A | * | 1/1994 | Iizuka et al. | 364/461 |
| 5,396,426 A | * | 3/1995 | Hibino et al. | 364/426.04 |
| 5,420,792 A | * | 5/1995 | Butsuen et al. | 364/426.04 |
| 5,629,669 A | * | 5/1997 | Asano et al. | 340/436 |
| 5,805,103 A | * | 9/1998 | Doi et al. | 342/70 |
| 5,839,534 A | * | 11/1998 | Chakraborty et al. | 180/169 |
| 6,119,068 A | * | 9/2000 | Kannonji | 701/301 |
| 6,150,932 A | * | 11/2000 | Kenue | 340/435 |

FOREIGN PATENT DOCUMENTS

| JP | A 08-192659 | 7/1996 |
|---|---|---|
| JP | A 11-242800 | 9/1999 |

* cited by examiner

Primary Examiner—Daniel J. Wu
Assistant Examiner—Son Tang
(74) Attorney, Agent, or Firm—Oliff & Berridge, PLC

(57) ABSTRACT

An alarm device generates an alarm when a distance between a vehicle and an object that exists in a set region in front of the vehicle is smaller than a set distance. A controller of the alarm device determines a tentative set distance based on at least one of a running speed of the vehicle and a relative velocity between the vehicle and the object, and then corrects the tentative set distance based on at least a deceleration of the vehicle, so as to determine a final set distance.

19 Claims, 15 Drawing Sheets

[ON STATE]

[OFF STATE]

Dw1 DETERMINATION MAP

Dw2 DETERMINATION MAP

ALARM DEVICE AND RUNNING CONTROL APPARATUS INCLUDING THE ALARM DEVICE

INCORPORATION BY REFERENCE

The disclosure of Japanese Patent Application No. 2000-258971 filed on Aug. 29, 2000, including the specification, drawings and abstract is incorporated herein by reference in its entirety.

BACKGROUND OF THE INVENTION

1. Field of Invention

The invention relates to an alarm device that generates an alarm when the distance between a vehicle and an object in front of the vehicle becomes smaller than a set distance.

2. Description of Related Art

An alarm device as disclosed in Japanese Laid-open Patent Publication No. 8-192659 is adapted to generate an alarm when the inter-vehicle distance between a vehicle and a preceding vehicle becomes equal to or smaller than a set distance that is determined based on a relative velocity between the vehicle and the preceding vehicle.

However, the alarm device as disclosed in the above-identified publication may generate an alarm in different timing from that expected by the driver or vehicle operator, and the driver may feel uncomfortable or embarrassed. For example, when the vehicle is in the course of decelerating, the driver may feel that the timing of generation of an alarm is too early.

SUMMARY OF THE INVENTION

It is therefore an object of the invention to provide an alarm device that generates an alarm based on a distance between the vehicle and an object that exists in a set region in front of the vehicle, so that the driver or vehicle operator feels less confused or uncomfortable.

To accomplish the above and/or other objects, one aspect of the invention provides an alarm device that generates an alarm when a distance between a vehicle and an object that exists in a set region in front of the vehicle is smaller than a set distance, which alarm device comprises a controller that: (1) determines a tentative set distance based on at least one of a running speed of the vehicle and a relative velocity between the vehicle and the object; and (2) corrects the determined tentative set distance, based on at least a deceleration of the vehicle, so as to determine a final set distance.

The alarm device as described above is adapted to generate an alarm when the distance between the vehicle and the object becomes equal to or smaller than the final set distance determined by the controller. The final set distance is obtained by correcting the tentative set distance determined based on at least one of the relative velocity and the running speed of the vehicle, based on the deceleration of the vehicle. For example, the tentative set distance is corrected so that the final set distance is set to a smaller value as the deceleration becomes larger. Thus, an alarm is less likely to be generated when the deceleration is relatively large, as compared with when the deceleration is relatively small.

Generally, the driver has a sense of safety or security in the case where the vehicle is in the course of decelerating. If the set distance determined in this case is the same as that determined while the vehicle is not decelerating, the driver may feel that the alarm is not very useful or redundant, or that the timing of generation of the alarm is too early. In view of this situation, if it makes it more difficult (less likely) to generate an alarm by setting the set distance to a smaller value, the driver is less likely to feel confused or uncomfortable.

In general, the deceleration of the vehicle increases when the vehicle is running on an uphill, and decreases when the vehicle is running on a downhill. Since the final set distance is made longer with a reduction in the deceleration of the vehicle according to the invention, an alarm is advantageously generated relatively early when the vehicle is running on a downhill.

The set region as indicated above is determined, for example, based on a region in which an object can be detected by an object detector. While the object detector functions to detect an object in a set region in front of the vehicle, the set region may be a region that extends in a two-dimensional field, or a region that extends in a three-dimensional field. One type of the object detector, such as a laser radar device, may be arranged to detect an object based on the receiving state of an electromagnetic wave that is emitted forward of the vehicle and is reflected by the object. Another type of the object detector, such as that including a CCD camera, may be arranged to detect an object based on image information captured by the detector. In the former type of the detector, the set region may be determined based on a region that is common to a region irradiated with the electromagnetic wave and a region in which the reflected wave can be received. In the latter type of the detector, the set region may be determined based on a region in which an image can be captured by a CCD camera. These regions in which an object can be detected depend on, for example, the function or performance of the object detector, but may also depend on the weather, and other conditions. For example, the set region, when it is a two-dimensional region, may be defined based on at least one of: (a) an irradiation angle of electromagnetic wave in the horizontal direction, and (b) a shorter one of the irradiation distance of the electromagnetic wave and the receiving distance of the reflected wave. The set region, when it is a three-dimensional region, may be defined based on, for example: (c) the irradiation angle of electromagnetic wave in the horizontal direction, (d) the irradiation angle of the wave in the vertical direction, and (e) the shorter one of the irradiation distance and the receiving distance.

The object that exists in the set region is not limited to a moving object. The invention is equally applicable to the case where the object is in a stationary state, as well as the case where the object is in a moving state.

According to one preferred embodiment of the invention, the controller sets a correction value used for correcting the tentative set distance, to a smaller value, as the deceleration of the vehicle increases.

The final value of the set distance may be obtained by, for example, adding the correction value based on the deceleration to the tentative set distance, or by multiplying the tentative set distance by the correction value. The correction value is reduced with an increase in the deceleration of the vehicle. As a result, the final set distance can be made longer as the deceleration increases, so that an alarm is less likely to be generated.

When the final set distance is obtained by adding the correction value to the tentative set distance, the correction value can be reduced by increasing the absolute value of the correction value when it is a negative value, or by reducing the correction value when it is a positive value.

When the final set distance is obtained by multiplying the tentative set distance by the correction value, the correction value is set to 1 when the deceleration is equal to a reference value, and is set to be smaller than 1 when the deceleration is larger than the reference value. Furthermore, the correction value is set to be larger than 1 when the deceleration is smaller than the reference value.

According to another preferred embodiment of the invention, the controller determines the tentative and/or final set distance taking account of a relative positional relationship between the vehicle and the object, which relationship is requested by a vehicle operator.

The alarm device according to the above preferred embodiment of the invention takes the relative positional relationship requested by the driver into consideration when determining the set distance. For example, the set distance is made larger when a desired distance as the relative positional relationship requested by the vehicle operator is larger, as compared with the case where the desired distance is smaller. With this arrangement, the vehicle operator feels less confused or less uncomfortable upon generation of the alarm.

As the relative positional relationship requested by the vehicle operator, a desired relative velocity, a desired relative deceleration, a desired approach time, and so forth, may be considered in addition to or in place of the desired distance. For example, the requested relative positional relationship may be set through an operation or manipulation by the vehicle operator, or the like. The vehicle operator sets the desired inter-vehicle distance, inter-vehicle time, and the like, by manipulating an operating member, such as a switch, or a touch panel.

According to a second aspect of the invention, there is provided an alarm device that generates an alarm when a distance between a vehicle and an object that exists in a set region in front of the vehicle is smaller than a set distance, comprising a controller that: determines a tentative set distance based on at least one of a running speed of the vehicle and a relative velocity between the vehicle and the object; and corrects the determined tentative set distance, based on at least a relative deceleration between the vehicle and the object, so as to determine a final set distance.

In the alarm device as described above, the final set distance is obtained by correcting the determined tentative set distance, based on the relative deceleration. The relative deceleration represents the tendency of the vehicle to be separated or spaced apart from the object, which will be called "separation tendency", or the tendency of the vehicle to approach the object, which will be called "approach tendency". The relative deceleration increases with an increase in the separation tendency. If the alarm device generates an alarm in the same timing, the driver is more likely to feel that the timing of generation of the alarm is too early as the separation tendency becomes stronger. If the final set distance is made smaller as the separation tendency becomes stronger, the driver is less likely to feel confused or uncomfortable upon generation of an alarm.

In one embodiment of the above aspect of the invention, the controller determines the final value of the set distance by correcting the tentative set distance based on both a deceleration of the vehicle and the relative deceleration between the vehicle and the object.

In another embodiment of the invention, the controller sets a correction value for correcting the tentative set distance, to a smaller value, as the tendency of the vehicle to be separated from the object is stronger, as compared with the case when the tendency of the vehicle to approach the object is stronger.

The correction value determined based on the relative deceleration is increased as the tendency of the vehicle to approach the object becomes stronger, so that the final value of the set distance is increased. The final set distance may be obtained by adding the correction value to the tentative set distance, or by multiplying the tentative set distance by the correction value.

In another embodiment of the invention, the controller determines at least one of the tentative set distance and the final set distance with reference to a map or maps.

If the map is prepared in advance and stored in, for example, ROM, the set distance can be easily determined using the map.

According to a third aspect of the invention, there is provided an alarm device that generates an alarm when a distance between a vehicle and an object that exists in a set region in front of the vehicle is smaller than a set distance, comprising a controller that: determines the set distance based on (a) at least one of a running speed of the vehicle and a relative velocity between the vehicle and the object, (b) a deceleration of the vehicle, and (c) a relative deceleration between the vehicle and the object.

According to a fourth aspect of the invention, there is provided an alarm device that generates an alarm when a distance between a vehicle and an object that exists in a set region in front of the vehicle is smaller than a set distance, comprising a controller that: determines the set distance based on (a) at least one of a running speed of the vehicle and a relative velocity between the vehicle and the object, and (b) a relative deceleration between the vehicle and the object.

According to a fifth aspect of the invention, there is provided an alarm device that generates an alarm when a relative positional relationship between a vehicle and an object that exists in a set region in front of the vehicle represents a tendency of the vehicle to approach the object as compared with a set relative positional relationship, comprising a controller that: determines a tentative set relative positional relationship based on at least one of a running speed of the vehicle and a relative velocity between the vehicle and the object; and corrects the determined tentative set relative positional relationship, based on at least one of a deceleration of the vehicle and a relative deceleration between the vehicle and the object, so as to determine a final set relative positional relationship.

The alarm device according to the above aspect of the invention may generate an alarm based on a parameter other than the distance between the vehicle and the object. For example, an alarm may be generated when the approach speed as a relative velocity is greater than a set speed, or when the relative deceleration indicates a stronger tendency of the vehicle to approach the object, as compared with a certain criterion. Thus, an alarm may be generated based on the relative velocity or the relative deceleration.

According to a further aspect of the invention, there is provided a running control apparatus, comprising: (1) the alarm device according to any of the above aspects of the invention, and (2) a running controller that controls a running state of the vehicle based on a relative positional relationship between the vehicle and the object.

In one embodiment of the above aspect of the invention, the running controller, during performance of a cruise control, controls the running state of the vehicle so that the vehicle and a preceding vehicle as the object are kept in a relative relationship that is requested by a vehicle operator or driver.

In another embodiment of the above aspect of the invention, the running controller, during performance of a deceleration control, decelerates the vehicle by applying a brake so as to restrain rotation of a wheel of the vehicle.

For example, the deceleration control may apply a brake when the distance between the vehicle and the object becomes equal to or smaller than the final set distance. In this case, an alarm is generated upon application of the brake.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

A vehicle running control apparatus according to a preferred embodiment of the invention will be described in detail. The running control apparatus includes an alarm device.

Figure 1:
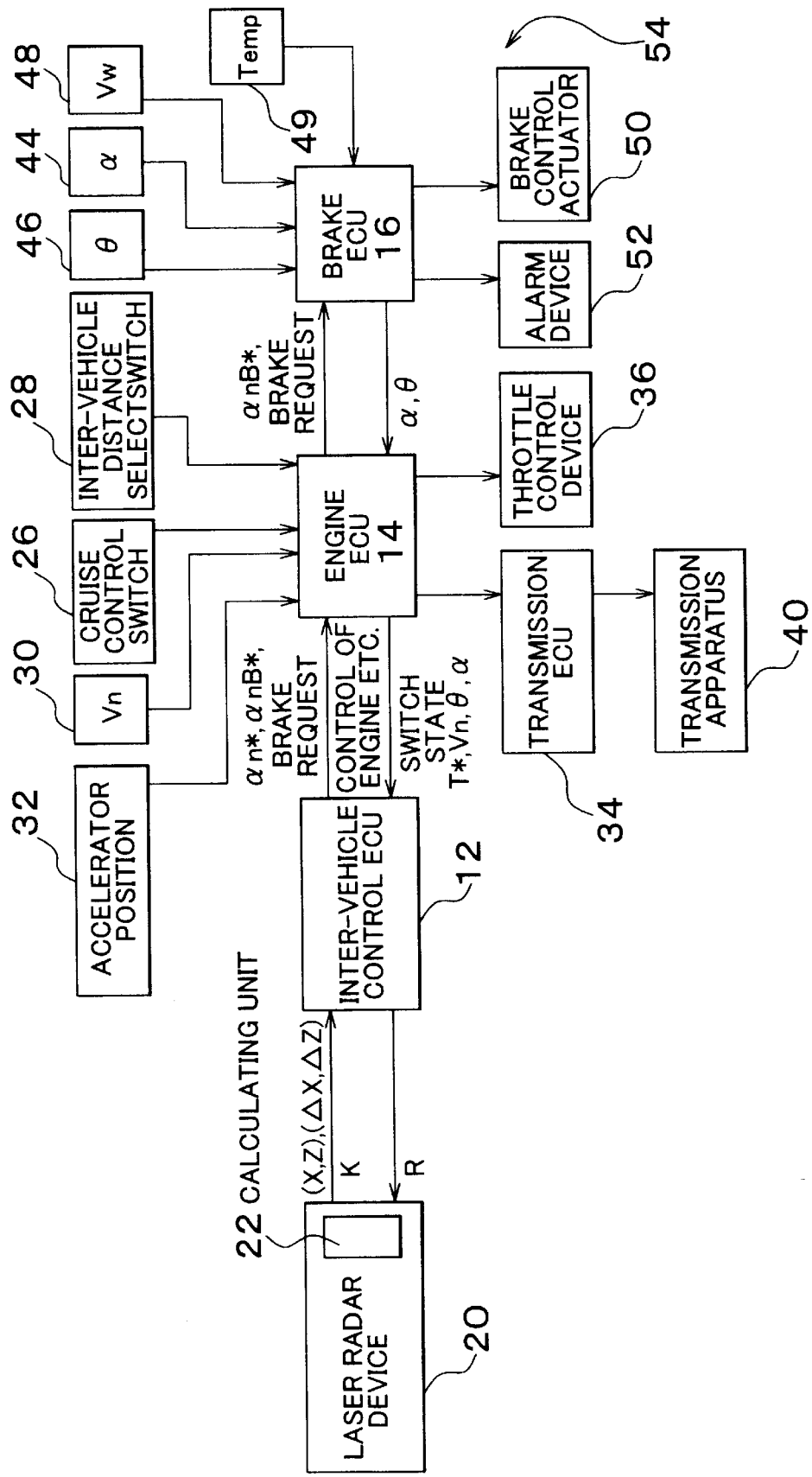
FIG. 1 is a block diagram showing the whole construction of a running control apparatus according to one embodiment of the invention.

Referring to FIG. 1, the running control apparatus includes an inter-vehicle control ECU 12, an engine ECU 14 and a brake ECU 16. Each of the inter-vehicle control ECU 12, engine ECU 14 and the brake ECU 16 mainly consists of a computer, and includes a CPU, RAM, ROM, input and output portions, and other components. The inter-vehicle control ECU 12 and the brake ECU 16 are respectively connected to the engine ECU 14, and information is transmitted between the ECUs 12 and 14, and between the ECUs 14 and 16.

A laser radar device 20 is connected to the inter-vehicle control ECU 12. The laser radar device 20 includes a calculating unit 22 that mainly consists of a computer. The calculating unit 22 calculates the position of the vehicle (i.e., the vehicle equipped with the running control apparatus of the embodiment) relative to an object detected by the laser radar device 20, and an amount of change of the relative position, and transmits information indicative of the relative position and the change amount to the inter-vehicle control ECU 12. Furthermore, the calculating unit 22 calculates a probability K that the detected object is running on the same lane as the vehicle, and transmits the probability K to the inter-vehicle control ECU 12. The probability K will be referred to as "same-lane probability" when appropriate.

The laser radar device 20 is of substantially the same type of an inter-vehicle distance alarm device as disclosed in Japanese Laid-open Patent Publication No. 11-45398, and thus will not be described in detail. The laser radar device 20, which is mounted on, for example, a lower part of a bumper at the front of the vehicle, is adapted to emit a laser beam forward of the vehicle, and receive a reflected beam. The laser radar device 20 is of a two-dimensional scanning type, and scans a predetermined irradiation region with the laser beam in accordance with rotation of a polygon mirror. The irradiation region to be irradiated with the laser beam is defined in horizontal and vertical directions, and is divided into 105 sections in the horizontal direction and is divided into 6 sections in the vertical direction. Thus, the irradiation region is divided into a total of 630 minute regions. In operation, an object in a set region (which will be described later) is detected based on a light-receiving state in which the light reflected by the minute regions is received by the laser radar device 20.

The above-indicated set region may be defined as a region in which an object can be detected by the laser radar device 20. In this embodiment, the set region is determined based on the irradiation region and the smaller one of the traveling distance of the laser beam and the receiving distance of the reflected beam. The set region depends on the capability of the laser radar device 20, and may vary depending upon the weather, or the like.

The laser radar device 20 determines a group of regions in which the same object is supposedly located, based on a light-receiving state in which the reflected beam is received, and obtains a relative position (expressed in two-dimensional terms) of each of the regions in which the same object is supposed to be located, with respect to the vehicle.

The relative position is expressed as a point on a two-dimensional coordinate system (or plane coordinates) that is defined by a predicted vehicle travelling line, and a line that is perpendicular to the predicted travelling line and is parallel to the width direction of the vehicle. The predicted travelling line is determined based on the radius R of a turn of the vehicle, and other parameters. The position Z along the predicted travelling direction of the detected object represents a distance from the vehicle to the object as measured along the predicted travelling line, and the position X in the width direction represents a spacing from the predicted travelling line as viewed in the direction perpendicular to the predicted travelling line. In this embodiment, the plane coordinates determined by the predicted travelling line and the orthogonal line are converted into rectangular Cartesian coordinates as a result of conversion of the predicted travelling line into a straight line, and the relative position of the object is represented by a position (X,Z) on the thus obtained rectangular coordinates.

Also, the same-lane probability K as indicated above is obtained based on the relative position (X, Z) of the object. The plane (X, Z) as represented by the above-described rectangular Cartesian coordinates is divided into a plurality of regions, and one of the regions to which the relative position (X, Z) of the object belongs is determined. For example, a first region A1 represents a bell-shaped region in front of the vehicle, or a region that tapers in the Z direction (namely, the width of the region in the X direction decreases with an increase in the distance as measured in the Z direction). A second region A2 represents a region that includes a portion located farther ahead of the first region A1 (i.e., in the positive Z direction) and a portion that extends in the X direction (vehicle width direction) to be wider than the first region A1. In addition, a third region A3, a fourth region A4, and following regions are provided in the order in which the smaller number of region is located closer to the vehicle. Thus, the n-th region An is spaced a farther distance apart from the vehicle as compared with the (n−1)th region. Also, the width of the region An in the X direction increases with an increase in the number n and an increase in the distance in the Z direction. The calculating unit 22 stores each region An in association with the probability Kn, such that the value of the probability Kn is reduced with an increase in the number n.

For example, when the center (X, Z) of the object belongs to the m-th region Am, the probability Km corresponding to the m-th region A is set as the same-line probability K (=Km).

The information transmitted from the laser radar device 20 to the inter-vehicle control ECU 12 include: (1) information indicative of the relative position (X, Z) of the object on the rectangular Cartesian coordinates, (2) information indicative of the amount of change (ΔX, ΔZ) of the relative position, and (3) information indicative of the same-lane probability K.

The relative position (X, Z) of the object transmitted to the inter-vehicle ECU 12 is not limited to the relative position of the center of the object as in this embodiment, but may be that of a point that typically represents the object in question.

The same-lane probability K may be obtained in view of the relative position of a point other than the center of the object. For example, when at least a part of the object (for example, a part of the profile of the object) belongs to the first region A1, the same-lane probability K is set to K1. It is also possible to obtain regions to which a plurality of points that represent the object belong, and the average value or intermediate value of the probabilities respectively corresponding to the plural regions can be set as the same-lane probability K. In this case, the same-lane probability K may be determined taking weighting into account. For example, a relatively large degree of weighting is given to the region to which the center belongs, and a relatively small degree of weighting is given to the regions to which the points that define the profile belong.

The same-lane probability K may be determined based on the result of a single-time detection of the object, but may also be determined in view of the same-lane probability obtained in the previous cycle. In this case, the weight of the current same-lane probability relative to the previous same-lane probability may be determined based on the inter-vehicle distance Z. For example, the weight may be increased as the inter-vehicle distance Z decreases.

The same-lane probability K may also be determined by the inter-vehicle control ECU 12.

The information, such as the relative position, transmitted from the laser radar device 20 to the inter-vehicle control ECU 12 may be obtained with respect to all of the minute regions in which the object is supposed to be located.

The inter-vehicle control ECU 12 determines whether the object is in a moving state or a stationary state, on the basis of the relative position of the object and the change amount thereof which are transmitted from the laser radar device 20, along with the relative velocity of the object and the speed of the vehicle. The object is determined as being in a stationary state when an approach speed as one type of the relative velocity is equal to or higher than a set speed, or when an absolute value of a difference between the relative velocity and the speed of the vehicle is equal to or smaller than a set value (i.e., the relative velocity is substantially equal to the speed of the vehicle).

Also, a target deceleration $\alpha n^*$, $\alpha nB^*$, or the like, is determined based on the relative position of the object, the amount of change in the relative position, information transmitted from the engine ECU 14, and so forth. In addition, information on control of the engine and other components, information indicating the presence of a request for application of brakes, and other information are produced, and are transmitted to the engine ECU 14. The information indicating the presence of a request for braking and the information representing the target deceleration $\alpha nB^*$, and other information are transmitted to the brake ECU 16 via the engine ECU 14. The information indicating the presence of a request for application of brakes will be hereinafter called "brake-request information".

The radius R of a turn of the vehicle is obtained based on a steering angle θ of the steering wheel and the running speed Vn of the vehicle, and information representing the radius R of the turn is transmitted to the laser radar device 20. The information representing the steering angle θ is transmitted from the brake ECU 16 to the inter-vehicle ECU 12 via the engine ECU 14, and the information representing the running speed Vn is transmitted from the engine ECU 14 to the inter-vehicle ECU 12.

As shown in FIG. 1, a cruise control switch 26, inter-vehicle time select switch 28, a vehicle speed sensor 30, and an accelerator position sensor 32, for example, are connected to the engine ECU 14. The engine ECU 14 is in turn connected to, for example, a transmission ECU 34, and a throttle control device 36 as a component of the engine apparatus. The engine ECU 14 is adapted to control driving conditions of respective components of the engine apparatus, based on the accelerator position and other parameters.

The cruise control switch 26 can be switched between a position in which at least a command for cruise control is generated, and a position in which such a command is not generated. The inter-vehicle time select switch 28 is operated to select a desired inter-vehicle time when the position for commanding cruise control is established. These cruise control switch 26 and inter-vehicle time select switch 28 are operated by the driver. Through an operation of the inter-vehicle time select switch 28, a positional relationship of the vehicle relative to the object as desired or requested by the driver can be set.

The inter-vehicle time select switch 28 is operable to select one of three-stage inter-vehicle time periods, namely, SHORT, MEDIUM and LONG. The SHORT, MEDIUM and LONG of the inter-vehicle time may correspond to about 40 m, 45 m and 55 m of inter-vehicle distance when the vehicle runs at a speed of 80 km/h. Under cruise control, the running conditions of the vehicle are controlled so that the inter-vehicle distance between the vehicle and the preceding vehicle is kept substantially equal to the inter-vehicle distance corresponding to the selected inter-vehicle time. If no preceding vehicle is detected, however, the vehicle is controlled so as to run at a speed equal to or lower than the set speed. In this case, the speed setting is separately performed by the driver.

The state of the cruise control switch 26 (i.e., the presence of a command for cruise control), the state of the inter-vehicle time select switch 28 (i.e., information representing the selected inter-vehicle time), and information representing the speed of the vehicle detected by the vehicle speed sensor 30 are transmitted to the inter-vehicle control ECU 12. These types of information may be called vehicle information for use in cruise control. Namely, these types of vehicle information are needed or required for implementing cruise control.

It is to be noted that the cruise control is inhibited in the cases, for example, where the accelerator pedal is operated by the driver, and where the brake pedal is operated. The cruise control is also inhibited when antilock control or vehicle behavior control, or the like, is performed. In other words, it is desirable to give priority to operations by the driver over cruise control, and to give priority to antilock control and vehicle behavior control over cruise control for the sake of improved safety. The cruise control is also inhibited when an abnormality is detected in the system. The cruise control may be interrupted during its execution, or may be interrupted only temporarily, or may be inhibited from starting.

The engine ECU 14 is adapted to control the throttle control device 36 in accordance with information transmitted from the inter-vehicle control ECU 12, and transmit a control command relating to the speed ratio or change gear ratio to the transmission ECU 34. The transmission ECU 34 controls a transmission 40 in accordance with the speed-ratio control command transmitted from the engine ECU 14, so as to control the speed ratio or change gear ratio.

The engine ECU 14 transmits brake control information and the like received from the inter-vehicle distance ECU 12, to the brake ECU 16. The brake control information includes information indicating the presence of a request for application of brakes (or brake-request information), information representing the target deceleration $\alpha nB^*$, and so forth.

Instead of controlling the throttle control device 36, the engine ECU 14 may perform control of the amount of fuel injected into combustion chambers of the engine, for example.

A deceleration sensor 44, a steering angle sensor 46 for detecting the steering angle θ of the steering wheel, a wheel speed sensor 48 for detecting the speed of rotation of each wheel, a temperature sensor 49, and the like, are connected to the brake ECU 16. The brake ECU 16 is connected to a brake control actuator 50, an alarm device 52, and the like.

During cruise control, the brake ECU 16 controls the brake control actuator 50 so that the actual deceleration $\alpha n$ detected by the deceleration sensor 44 approaches the target deceleration $\alpha nB^*$ transmitted from the engine ECU 14. During vehicle stability control, the brake control actuator 50 is controlled based on the steering angle, yaw rate and other parameters, so that the vehicle behavior is stabilized. The brake ECU 16, which serves to control the brake control actuator 50, may be replaced by another ECU, such as ABSECU (antilock ECU) and VSCECU (vehicle stability control ECU), which perform specified controls.

The information indicative of the steering angle θ of the steering wheel is transmitted to the inter-vehicle control ECU 12 via the engine ECU 14, as described above.

The alarm device 52 is activated when the inter-vehicle distance Z becomes equal to or smaller than an approach distance Dw, and is also activated when it is undesirable to apply an automatic brake even through information indicating the presence of a request for braking is transmitted to the brake ECU 16. The alarm device 52 may be activated in response to a command from the inter-vehicle control ECU 12, mainly for informing the driver that the inter-vehicle distance becomes equal to or less than the approach distance Dw, thereby to prompt the driver to perform a braking operation. The alarm device 52 may also be activated depending upon the operating state of the brake apparatus 54 or the running conditions of the vehicle, mainly for informing the driver that application of an automatic brake is being inhibited.

In the above-described two cases, the alarm device 52 may generate the same or similar kind of alarm, or may generate different kinds of alarms. Also, the alarm device 52 may generate sound, or may use a flashing lamp, for example. Alternatively, the alarm device 52 may generate the content of the warning (e.g., the state of the vehicle) through voice, or may generate the warning on a display. Thus, the alarm device 52 may be of any type that functions as an informing device to widely inform the driver of desired information.

The deceleration sensor 44 functions to detect the deceleration of the vehicle. In the present embodiment, the deceleration is expressed by a positive value. Therefore, a larger deceleration means a smaller acceleration where the deceleration is expressed as a negative acceleration, and also means a larger absolute value of the acceleration. The wheel sensor 48 detects the speed of rotation of each wheel. In the present embodiment, a slipping state of each wheel is detected based on the rotation speed of each wheel, and an estimated vehicle speed that is obtained based on the wheel speed(s) of the non-driven wheel(s). The temperature sensor 49 serves to detect the temperature of the brake control actuator 50. The brake control actuator 50 is operated with electric energy supplied thereto, and therefore may suffer from overheating if the actuator 50 is kept continuously operated for a long period of time.

Figure 2:
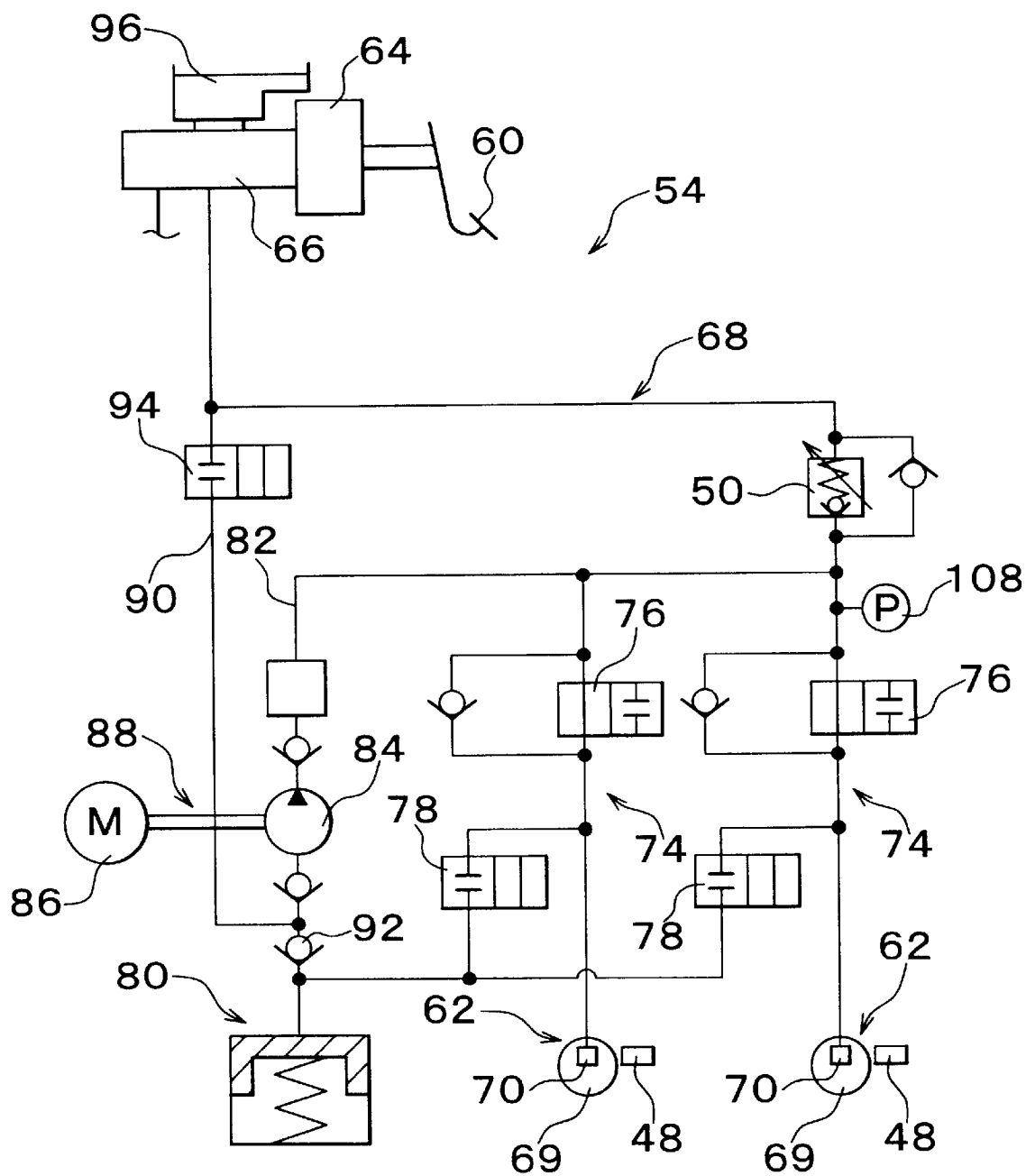
FIG. 2 is a circuit diagram of a brake apparatus including a brake control actuator included in the running control apparatus of FIG. 1.

FIG. 2 shows a brake circuit of the brake apparatus 54 that includes the brake control actuator 50. The brake apparatus 54 is capable of applying an automatic brake. Namely, the brake apparatus 54 is able to actuate brakes 62 for respective wheels even if a brake pedal 60 serving as a brake operating member is not operated by the driver.

A master cylinder 66 is connected to the brake pedal 60 via a booster 64. Each of the brakes 62 for restraining or inhibiting rotation of the corresponding wheels 69 includes a brake cylinder 70 that is connected to the master cylinder 66 through a liquid passage 68. Each brake 62 is a hydraulic brake that is actuated by a hydraulic pressure applied from the corresponding brake cylinder 70 so as to restrain or inhibit rotation of the corresponding wheel 69.

A pressure control valve 50 serving as the brake control actuator is provided midway in the liquid passage 68. Also, individual hydraulic pressure control devices 74 are provided for the respective brake cylinders 70. Each of the individual hydraulic pressure control devices 74 includes a pressure-increase control valve 76 and a pressure-decrease control valve 78. The pressure-increase control valve 76 is disposed between the pressure control valve 50 and the corresponding brake cylinder 70, and the pressure-decrease control valve 78 is disposed between the corresponding brake cylinder 70 and a reservoir 80.

A pump passage 82 extends from the reservoir 80, and is connected to the liquid passage 68 on the downstream side of the pressure control valve 50. A pump 84 that is driven by a pump motor 86 is provided in the pump passage 82. The pump 84 and the pump motor 86 constitute a power type hydraulic source 88.

A hydraulic fluid supply passage 90 extends from the master cylinder 66, and is connected to the pump passage 82 on one side of a check valve 92 that is closer to the pump 84. The check valve 92 serves to inhibit flow of hydraulic fluid from the master cylinder 66 to the reservoir 80. With the check valve 92 thus provided, the hydraulic fluid that flows from the master cylinder 66 is directly pumped up by the pump 84. A solenoid-operated valve 94 is provided in the hydraulic fluid supply passage 90. When the solenoid-operated valve 94 is placed in the closed state, a hydraulic fluid is supplied from a master reservoir 96 via the master cylinder 66.

Figure 3B:
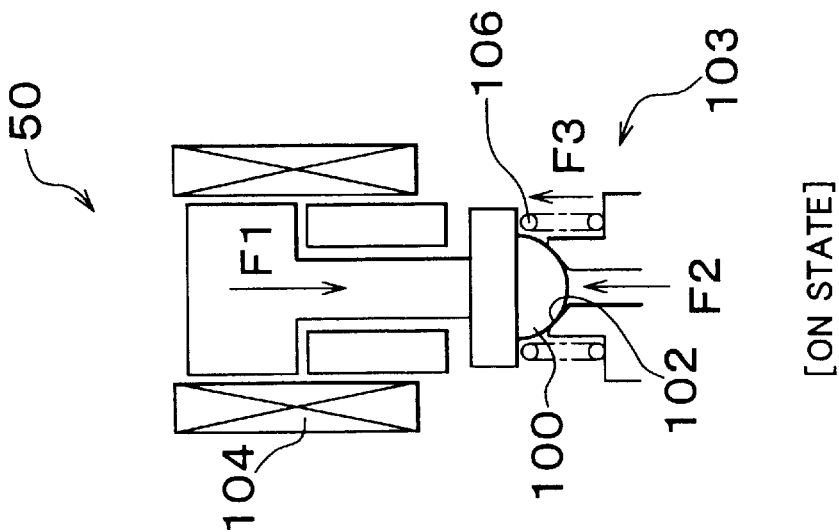
FIG. 3A and FIG. 3B are views showing the OFF state and the ON state, respectively, of the brake control actuator.
Figure 3A:
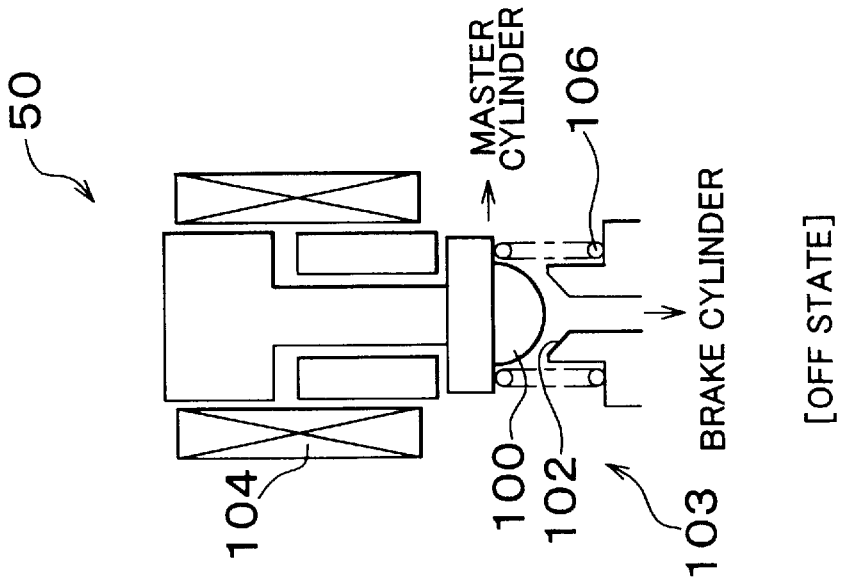

As shown in FIGS. 3A and 3B, the pressure control valve 50 includes a seating valve 103 including a valve body 100 and a valve seat 102, and a coil 104 that generates magnetic force for controlling the relative position between the valve body 100 and the valve seat 102.

The pressure control valve 50 is normally placed in an open state in which the valve body 100 is spaced from the valve seat 102 under an elastic force of a spring 106 when the coil 104 is in a non-energized (OFF) state.

If the coil 104 is in an energized (ON) state, magnetic force F1 of the coil 104 is applied in such a direction as to seat the valve body 100 on the valve seat 102. Also, force F2 derived from a difference between the brake cylinder pressure and the master cylinder pressure and the elastic force F3 of the spring 106 are applied to the valve body 100 in a direction opposite to that of the magnetic force F1. When the brake pedal 60 is in a non-operated condition, the hydraulic pressure of the master cylinder 66 is equal to the atmospheric pressure, and therefore the magnitude of the differential pressure between the master cylinder pressure and the brake cylinder pressure corresponds to that of the brake cylinder pressure.

If the magnetic force F1 is greater than the force F2 based on the differential pressure, and the following expression:

$$F2 \leq F1 - F3$$

is satisfied, the valve body 100 is seated on the valve seat 102, and the hydraulic fluid is inhibited from flowing from the brake cylinders 70. At the same time, a high-pressure hydraulic fluid is supplied from the pump 84 to each brake cylinder 70, so as to increase the hydraulic pressure of the brake cylinder 70.

If the force F2 based on the differential pressure increases as the brake cylinder pressure increases, and the expression: F2>F1−F3 is satisfied, the valve body 100 is lifted from the valve seat 102. As a result, the hydraulic fluid in each brake cylinder 70 is returned to the master cylinder 66, and the hydraulic pressure of the cylinder 70 is lowered. If the elastic force F3 is ignored in the above expression, the brake cylinder pressure is controlled to a pressure level that is higher than the master cylinder pressure by an amount corresponding the magnetic force (or attraction force) F1 of the coil 104.

The magnitude of the magnetic force F1 of the coil 104 is designed to be linearly varied with the magnitude of the energizing or exciting current I of the coil 104.

When the hydraulic source 88 is in the operating state, the hydraulic pressure of the brake cylinders 70 is controlled by controlling current I supplied to the pressure control valve 50. The supply current I may be controlled in a feedback manner so that the brake pressure detected by the pressure sensor 108 becomes close to the target pressure. The brake pressure may be subjected to feed-forward control instead of feedback control. Namely, even if the brake pedal 60 is not operated by the driver, the brakes 62 may be operated by hydraulic fluid supplied from the power hydraulic source 88 so as to restrain or inhibit rotation of the wheels 69. When there is a need to individually control the hydraulic pressures of the brake cylinders 70 of the respective wheels, for example, under antilock control or vehicle stability control, the hydraulic pressures are respectively controlled by the individual hydraulic pressure control valve devices 74.

The operation of the running control apparatus constructed as described above will be described.

The running control apparatus of this embodiment performs cruise control. While the running state of the vehicle is controlled so that the inter-vehicle distance between the vehicle and the preceding vehicle is kept equal to the inter-vehicle distance corresponding to the selected inter-vehicle time as described above, deceleration control is performed when the vehicle needs to be decelerated. Under the deceleration control, the throttle control device 36 of the engine apparatus or the transmission 40 is controlled, or the brake apparatus 54 is controlled so that the actual deceleration αn becomes close to the target deceleration αn*. When the necessity to decelerate the vehicle is relatively low, the throttle control device 36 or the transmission 40 is initially controlled. If the necessity to decelerate the vehicle is relatively high, and brake applying conditions (which will be described later) are satisfied, the brake apparatus 54 as well as the throttle control device 36 or the transmission 40 is controlled. Thus, the control of the throttle control device 36 or the transmission 40 has priority over that of the brake apparatus 54, so that the brake apparatus 54 is less frequently operated.

Figure 4:
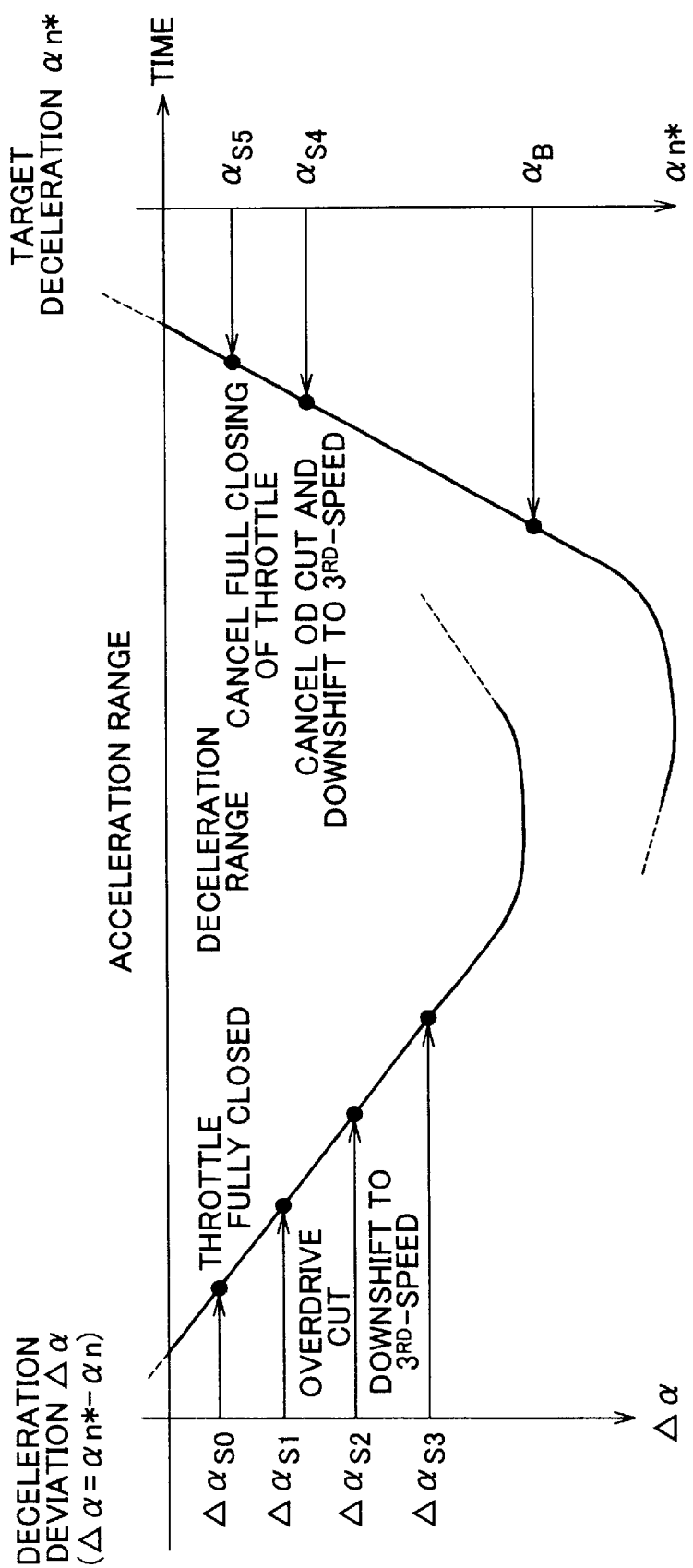
FIG. 4 is a view showing one example of control performed by the running control apparatus of FIG. 1.

The cruise control will be briefly described with reference to FIG. 4. In the present embodiment, the target deceleration αn* is determined based on the desired inter-vehicle time T* selected by the driver, the actual inter-vehicle time T (which is obtained by dividing the inter-vehicle distance Z by the speed Vn of the vehicle), and the relative velocity Vr. Then, a deceleration deviation Δαn is obtained by subtracting the actual deceleration αn from the target deceleration αn*. When the deceleration deviation Δαn is larger than zero, which means that the actual deceleration αn is smaller than the target deceleration $\alpha n^*$, there is a need to decelerate the vehicle. Namely, the deceleration of the vehicle needs to be increased to be larger than that as measured at the current point of time at which the vehicle is being decelerated or accelerated or running at a constant speed. It will be understood that the necessity of decelerating the vehicle is higher as the deceleration deviation $\Delta\alpha n$ is larger.

When the deceleration deviation $\Delta\alpha n$ is large, the throttle opening amount is initially reduced. More specifically, the throttle control device 36 controls the throttle opening amount in a feedback fashion so that the actual deceleration $\alpha n$ approaches the target deceleration $\alpha n^*$. If the deceleration deviation $\Delta\alpha n$ is equal to or greater than the zeroth threshold value $\Delta\alpha s$, the throttle opening amount is made equal to 0 (i.e., the throttle valve is fully closed). If the deceleration deviation $\Delta\alpha n$ is equal to or greater than the first threshold value $\Delta\alpha s1$, the transmission 40 is shifted down to the fourth-speed position. Namely, the transmission 40 is inhibited from being shifted to the fifth-speed (overdrive) position, under control called "overdrive cut". Thus, when the transmission 40 is placed in the fifth-speed position upon the start of the control, it is shifted down to the fourth-speed position.

When the deceleration deviation $\Delta\alpha n$ is equal to or greater than the second threshold value $\Delta\alpha s2$, and the brake applying conditions are satisfied, the brakes 62 are applied or actuated. When the brake applying conditions are satisfied, the power type hydraulic source 88 is placed in the activated (ON) state, and current is supplied to the pressure control valve 50 in the brake apparatus 54. The current supplied to the pressure control valve 50 is determined or controlled to a level that will provide the target deceleration $\alpha n B^*$ for braking. As will be described later, the target deceleration $\alpha n B^*$ for braking, which is different from the above-indicated target deceleration $\alpha n$, is determined when the brake applying conditions are satisfied.

In the meantime, the alarm device 52 is activated when the inter-vehicle distance Z becomes smaller than the approach distance Dw. The approach distance Dw is determined as a sum of the first approach distance Dw1, the second approach distance Dw2, and the third approach distance Dw3. The first approach distance Dw1 is determined based on the desired inter-vehicle time $T^*$, the speed of the vehicle Vn and the relative velocity Vr, and the second approach distance Dw2 is determined based on the actual deceleration $\alpha n$ of the vehicle, and the third approach distance Dw3 is determined based on the relative deceleration $\alpha r$. Thus, the first approach distance Dw1 is not used as it is to obtain the approach distance, but is corrected based on the deceleration of the vehicle and the relative deceleration, to provide the final approach distance Dw.

Figure 5:
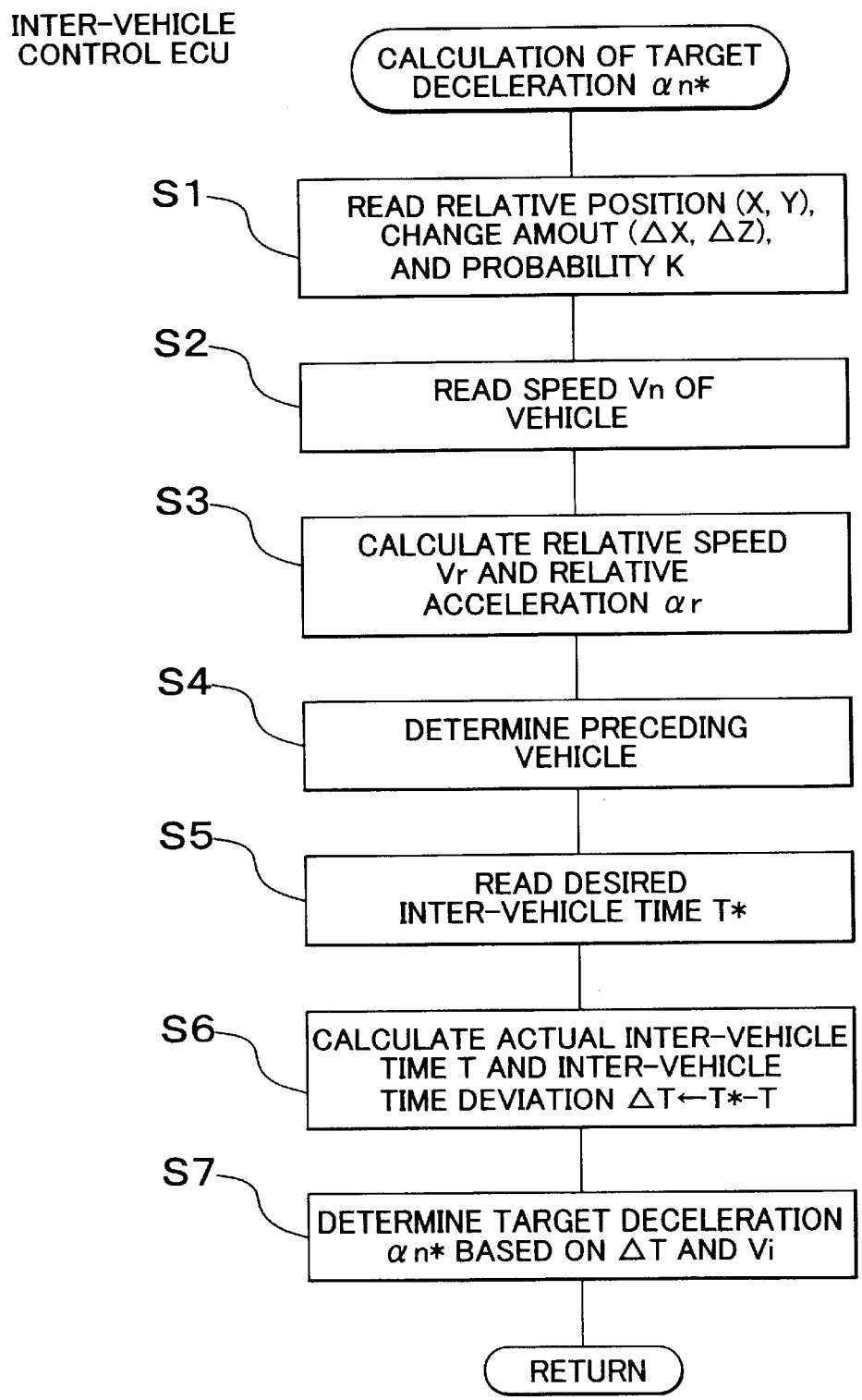
FIG. 5 is a flowchart illustrating a target deceleration determination program stored in a ROM of an inter-vehicle control ECU of the running control apparatus.

The inter-vehicle control ECU 12 executes a target deceleration determination program as shown in the flowchart of FIG. 5 each time information is transmitted from the laser radar device 20 to the inter-vehicle control ECU 12 in predetermined communication timing. While the speed Vn of the vehicle is transmitted from the engine ECU 14, it may be transmitted in response to vehicle speed request information from the inter-vehicle control ECU 12, or may be transmitted to and stored in an input/output portion of the inter-vehicle control ECU 12, irrespective of the request information. This also applies to communications between the engine ECU 14 and the brake ECU 16.

The inter-vehicle control ECU 12, and the like, is adapted to execute a plurality of programs in a time sharing manner.

In step S1, the inter-vehicle ECU 12 reads the relative position (X, Z) of the object, the amount of change ($\Delta X, \Delta Z$) in the relative position, and the same-lane probability K. In step S2, the ECU 12 reads the speed Vn of the vehicle. In step S3, the relative velocity Vr and the relative acceleration $\alpha r$ of the vehicle with respect to the object are calculated based on, for example, the amount of change ($\Delta X, \Delta Z$) in the relative position. In step S4, it is determined whether the object is a preceding vehicle. If the ECU 12 determines that the object is a moving object, namely, a preceding vehicle, a preceding vehicle flag is set.

In step S5, the inter-vehicle ECU 12 reads the inter-vehicle time set by the driver, i.e., the desired inter-vehicle time $T^*$. In step S6, the actual inter-vehicle time T is obtained by dividing the inter-vehicle distance Z by the speed Vn of the vehicle, and the inter-vehicle time deviation $\Delta T$ is obtained by subtracting the actual inter-vehicle time T from the desired inter-vehicle time $T^*$ ($\Delta T = T^* - T$).

In step S7, the target deceleration $\alpha n^*$ is determined based on the inter-vehicle time deviation $\Delta T$ and the relative velocity Vr. If the inter-vehicle time deviation $\Delta T$ is larger than 0, and the actual inter-vehicle time is shorter than the desired inter-vehicle time $T^*$, this means that the actual inter-vehicle distance is insufficient in view of the desired value, and there is a need to decelerate the vehicle. The necessity of decelerating the vehicle increases with an increase in the inter-vehicle time deviation $\Delta T$. If the inter-vehicle time deviation $\Delta T$ is smaller than 0, and the actual inter-vehicle time is longer than the desired inter-vehicle time $T^*$, this means that a sufficient inter-vehicle distance is present between the vehicle and the object. In this case, the vehicle does not need to be decelerated, or needs to be accelerated.

Figure 8:
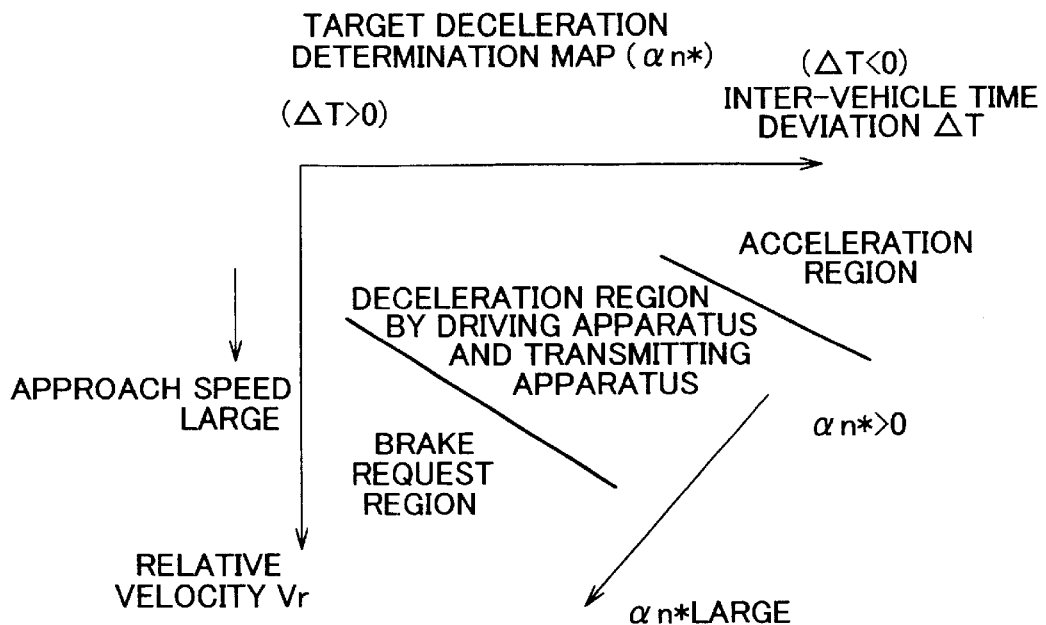
FIG. 8 is a map representing a table for determining a target deceleration, which table is stored in the ROM of the inter-vehicle control ECU.

As indicated in the map of FIG. 8, if the inter-vehicle time deviation $\Delta T$ is larger than zero, the target deceleration $\alpha n^*$ is increased with an increase in the absolute value of the deviation $\Delta T$. If the inter-vehicle time deviation $\Delta T$ is smaller than zero, the target deceleration $\alpha n^*$ is reduced with an increase in the absolute value of the deviation $\Delta T$, and the vehicle is then brought into an acceleration region. Also, the target deceleration $\alpha n^*$ is increased with an increase in the approach speed as one type of the relative velocity, since the necessity of decelerating the vehicle is higher as the approach speed is greater.

The target deceleration may also be determined based on the ratio ($\Delta T/T^*$) of the inter-vehicle time deviation $\Delta T$ to the desired inter-vehicle time, instead of the inter-vehicle time deviation $\Delta T$. Also, the inter-vehicle distance may be used instead of the inter-vehicle time. In any event, the target deceleration may take any value that relates to a deviation obtained by subtracting the actual relative positional relationship with the preceding vehicle from the desired relative positional relationship that is requested by the driver. In other words, the target deceleration may assume any value provided that it represents the necessity of deceleration. Thus, the target deceleration may be determined based on the deviation, or the proportion of the deviation, or any amount or value associated with the deviation.

Figure 6:
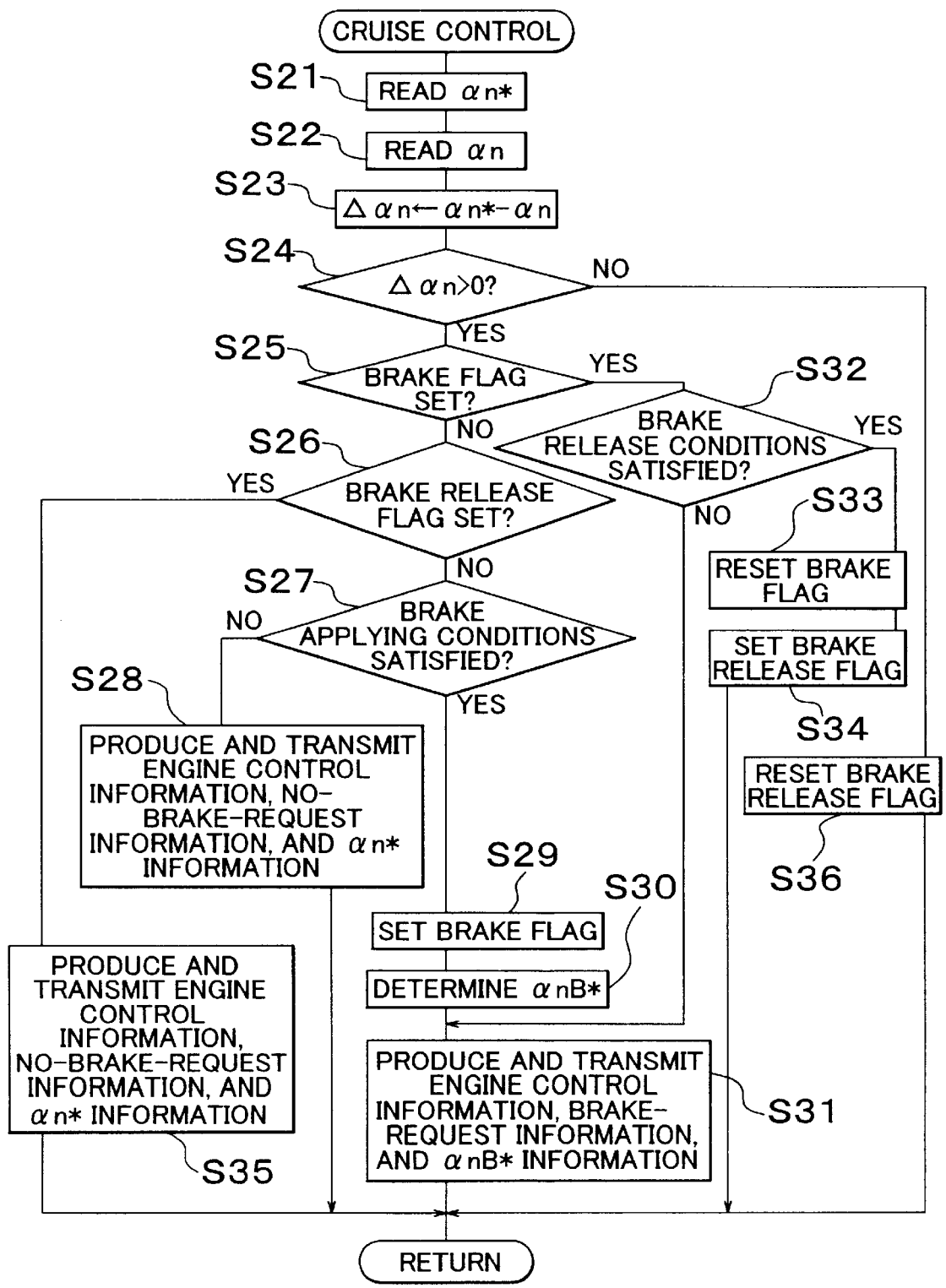
FIG. 6 is a flowchart indicating a cruise control program stored in the ROM of the inter-vehicle control ECU.

After determining the target deceleration $\alpha n^*$ according the flowchart of FIG. 5, a cruise control program as shown in the flowchart of FIG. 6 is executed at predetermined time intervals. In step S21 to step S23, the inter-vehicle ECU 12 reads the target deceleration $\alpha n^*$ and the actual deceleration $\alpha n$ of the vehicle, and obtains a deceleration deviation $\Delta\alpha n$ ($=\alpha n^* - \alpha n$) as a difference between the target deceleration $\alpha n^*$ and the actual deceleration $\alpha n$.

Step S24 is then executed to determine whether the deceleration deviation $\Delta\alpha n$ is larger than zero. The deceleration control is performed if the deceleration deviation $\Delta\alpha n$ is larger than zero, and acceleration control is performed if the deceleration deviation $\Delta\alpha n$ is equal to or smaller than zero.

Control then proceeds to step S25 to determine whether a brake flag is set, and then proceeds to step S26 to determine whether a brake release flag is set. If both of the brake flag and the brake release flag are reset, control proceeds to step S27 to determine whether the brake applying conditions are satisfied. If the brake applying conditions are not satisfied, information on control of the engine, etc., is produced in step S28, and no-brake-request information indicating the absence of a request for braking is produced. These pieces of information and the target deceleration $\alpha n^*$ are then transmitted to the engine ECU 14.

As described above, if the deceleration deviation $\Delta\alpha n$ is smaller than the zeroth threshold value $\Delta\alpha s0$, a command to control the throttle opening amount is produced, and, if the deceleration deviation $\Delta\alpha n$ is equal to or larger than the zeroth threshold value $\Delta\alpha s0$, a command to fully close the throttle valve is produced. If the deceleration deviation $\Delta\alpha n$ is equal to or greater than the first threshold value $\Delta\alpha s1$, an overdrive cut command and a command to fully close the throttle valve are produced. If the deceleration deviation $\Delta\alpha n$ is equal to or greater than the first threshold value $\Delta\alpha s2$, a command to shift the transmission 40 down to the $3^{rd}$-speed position and a command to fully close the throttle valve are produced. These pieces of information (e.g., throttle control command and speed-ratio control command) relating to control of the engine, etc., information representing the target deceleration $\alpha n^*$, and no-brake-request information are then transmitted to the engine ECU 14.

If it is determined in step S27 that the brake applying conditions are satisfied, step S29 and subsequent steps are executed. The brake applying conditions include four conditions, i.e., (a) the deceleration deviation $\Delta\alpha n$ is greater than the third threshold value $\Delta\alpha s3$, (b) the object detected by the laser radar device 20 is a preceding vehicle, (c) the same-lane probability is equal to or larger than a set probability, and (d) the inter-vehicle distance is smaller than a set distance. If all of these four conditions are satisfied, the inter-vehicle ECU 12 determines that the brake applying conditions are satisfied. The set distance used in the above condition (d) represents a distance at which the presence of the object can be reliably detected, and which is determined depending upon the performance of the laser radar device 20. If the brake applying conditions are satisfied, it means that the necessity to decelerate the vehicle is relatively high. Namely, the actual deceleration is insufficient compared to the target deceleration, and the preceding vehicle running on the same lane as the vehicle has been detected with a high probability. The above-indicated conditions (b) to (d) may also be considered as conditions under which application of brakes can be started.

Since the brakes 62 are actuated only when there is a high necessity to actuate brakes, unnecessary or redundant actuation of the brakes can be advantageously avoided.

If the laser radar device 20 detects a plurality of objects, and transmits information representing the relative positions of the respective objects to the inter-vehicle ECU 12, a preceding vehicle, which is among the objects and is located closest to the vehicle, is regarded as an object vehicle. The inter-vehicle ECU 12 then determines the inter-vehicle distance, relative velocity, relative deceleration and other relative positional relationships with respect to the object vehicle, and determines whether the same-lane probability K is equal to or larger than a set probability Ks.

If an affirmative decision (YES) is obtained in step S27, control proceeds to step S29 to set the brake flag, and then proceeds to step S30 to determine a target deceleration $\alpha nB^*$ for use in brake control. In step S31, brake-request information indicating the presence of a request for application of brakes and information relating to control of the engine, etc., are produced, and are transmitted to the engine ECU 14 along with information indicating the target deceleration $\alpha nB^*$. When the brakes are in operation, the information on control of the engine, etc., usually includes a command to shift the transmission down to the $3^{rd}$-speed position and a command to fully close the throttle valve.

Figure 9:
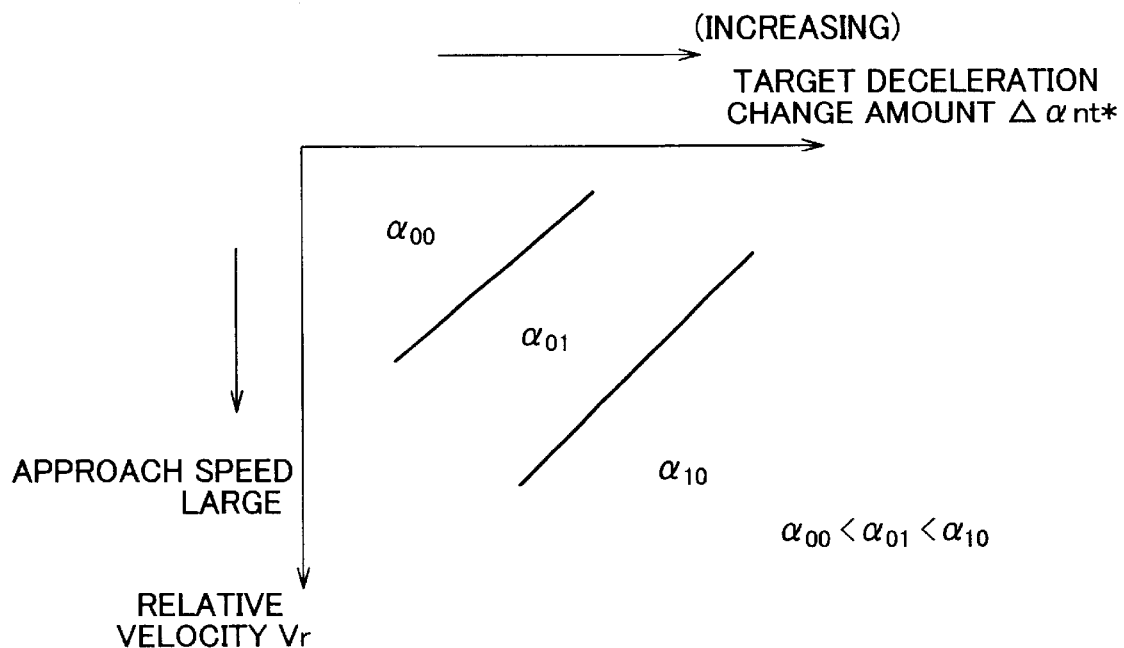
FIG. 9 is a map representing a table for determining a target deceleration for braking, which table is stored in the ROM of the inter-vehicle control ECU.

The target deceleration $\alpha nB^*$ for use in brake control is determined according to a table or map as shown in FIG. 9. More specifically, the target deceleration $\alpha nB^*$ for brake control is determined based on the amount of change $\Delta\alpha nt^*$ of the target deceleration $\alpha n^*$ at a point of time when the brake applying conditions are satisfied, with respect to time, and the relative velocity Vr. The amount of change $\Delta\alpha nt^*$ of the target deceleration $\alpha n^*$ with respect to time will be hereinafter called "the target deceleration change rate $\Delta\alpha nt^*$". If the target deceleration change rate $\Delta\alpha nt^*$ is a positive value, the target deceleration $\alpha n^*$ is in the course of increasing, which means that the necessity for deceleration has a tendency of increasing. On the contrary, if the target deceleration change rate $\Delta\alpha nt^*$ is a negative value, the target deceleration $\alpha n^*$ is in the course of decreasing, which means that the necessity for deceleration has a tendency of decreasing. Thus, the necessity to decelerate the vehicle can be predicted from the target deceleration change rate $\Delta\alpha nt^*$, and the target deceleration $\alpha nB^*$ for brake control is determined based on the target deceleration change rate $\Delta\alpha nt^*$ that is used for predicting the necessity to decelerate the vehicle.

When the target deceleration change rate $\Delta\alpha nt^*$ is a positive value, the target deceleration $\alpha nB^*$ for brake control is increased with an increase in the absolute value of the target deceleration change rate $\Delta\alpha nt^*$. Also, the target deceleration $\alpha nB^*$ for brake control is increased with an increase in the approach speed.

The brake applying conditions may include other conditions than the above-indicated four conditions. The other conditions may include at least one of the conditions that: (e) a command to shift the transmission down to the $3^{rd}$-speed position has been produced, (f) acceleration control is not being requested (i.e., the deceleration deviation $\Delta\alpha n$ is larger than 0), (g) a command to fully close the throttle valve has been produced, (h) the accelerator pedal is not being operated, and (i) antilock control or vehicle behavior control, or the like, is not being performed.

Since the vehicle is usually decelerated through control of the engine and/or other component(s), prior to actuation of the brakes 62, the conditions for actuating the brakes include those in which predetermined control is performed on the throttle control device 36 and/or the transmission 40. Also, the brake applying conditions include a condition that the brake apparatus 54 is in an operating state that permits an automatic brake to be applied according to cruise control.

While the brake control is being performed, an affirmative decision (YES) is obtained in step S25, and control proceeds to step S32 to determine whether a brake release condition or conditions is/are satisfied. If the brake release conditions are not satisfied, brake control continues to be performed, and step S31 is executed. In this case, the target deceleration $\alpha nB^*$ is equal to the value used in the previous control cycle. Thus, in the present embodiment, the target deceleration $\alpha nB^*$ for brake control is kept constant or kept at the same value during a period from a point of time when the brake applying conditions are satisfied, to a point when an operation to apply brakes is finished. In this connection, since the target deceleration $\alpha nB^*$ is determined based on the predicted value of the necessity for deceleration, as described above, the target deceleration $\alpha nB^*$ for brake control is prevented from immediately becoming an extremely inappropriate value in view of the relative positional relationship between the vehicle and the object.

Meanwhile, the target deceleration $\alpha nB^*$ for brake control may be changed during application of the brakes 62. For example, it may be desirable to change the target deceleration $\alpha nB^*$ for brake control when the target deceleration $\alpha n^*$ is changed by a set amount or larger with respect to the value set at the time of the start of the braking operation. It is also possible to change the target deceleration $\alpha nB^*$ when the relative positional relationship between the vehicle and the object, such as the inter-vehicle time or inter-vehicle distance, is changed by a set degree or larger. Alternatively, during a braking operation, the target deceleration $\alpha nB^*$ may be changed as needed to a value that is determined according to a map that is prepared based on the target deceleration change rate $\Delta\alpha n't^*$ and the relative velocity Vr. In this case, the target deceleration $\alpha nB^*$ is not continuously, but rather is discretely changed, as the target deceleration change rate $\Delta\alpha nt^*$ and the relative velocity Vr are continuously changed. Therefore, the target deceleration $\alpha nB^*$ is less frequently changed as compared with the case where it is continuously changed.

The brake release conditions may include at least one of the conditions that: (a) the target deceleration $\alpha n^*$ has decreased to be smaller than a brake release threshold value $\alpha B$, (b) the preceding vehicle is no longer detected, (c) there is no need to decelerate the vehicle by means of the brake apparatus 54 (i.e., no command for downshifting to the $3^{rd}$ speed position is produced, the accelerator pedal has been pressed, or an acceleration control command has been generated), and (d) the brake apparatus 54 has been brought into a state that makes it inappropriate or undesirable to continue cruise control. The condition (d) may be satisfied when an abnormality or a defect is detected in a system, or antilock control or vehicle behavior control has been started, or the brake apparatus 54 has been continuously operated for a set period of time or longer.

In some cases, the deceleration deviation $\Delta\alpha n$ becomes equal to or smaller than the second threshold value $\Delta\alpha s2$ before the target deceleration $\alpha n^*$ decreases to be smaller than the brake cancel threshold value $\alpha B$. In this case, the command for downshifting to the $3^{rd}$-speed position is cancelled, thus making it unnecessary to decelerate the vehicle by means of the brakes 62. Thus, it is determined whether the brake release conditions are satisfied or not, based on, for example, the result of detection of the preceding vehicle, the state of control of the engine, and the like, and the operating state of the brake apparatus 54. When the brake release conditions are satisfied, the brake flag is reset in step S33, and the brake release flag is set in step S34.

If the brake release flag is set, an affirmative decision (YES) is obtained in step S26, and a command to control the engine, or the like, is produced in step S35. In this case, when the target deceleration $\alpha n^*$ is smaller than a fourth threshold value $\alpha s4$, as shown in FIG. 4, information for canceling restriction of the speed ratio (or a command to permit normal control of the speed ratio) is produced, and is transmitted to the engine ECU 14 along with no-brake-request information indicating the absence of a request for braking and information representing the target deceleration $\alpha n^*$. When the target deceleration $\alpha n^*$ is smaller than a fifth threshold value $\alpha s5$, information (a throttle control command) to cancel fully closing of the throttle valve is produced.

Thus, in the present embodiment, the manner of controlling the throttle control device 36 and the transmission 40 before actuating the brakes is different from the manner of controlling these devices 36, 40 after canceling the braking operation (i.e., after releasing the brakes).

If the deceleration deviation $\Delta\alpha n$ becomes larger than zero, a negative decision (NO) is obtained in step S24, and the brake release flag is reset in step S36, The tables as represented by the maps of FIGS. 8 and 9 are not limited to those as used in the illustrated embodiment. For example, the maps are not limited to two-dimensional maps, but may be three-dimensional or other multi-dimensional maps. In this case, the inter-vehicle distance, and the like, may be considered. Also, the maps may not be necessarily fixed, but may be changed according to the result of learning. For example, a threshold value or a map value itself, may be changed based on the frequency of selection, the time period in which one value is kept constant, or the like. Thus, the maps may be changed so that the driver feels comfortable or agreeable during deceleration of the vehicle.

Figure 7:
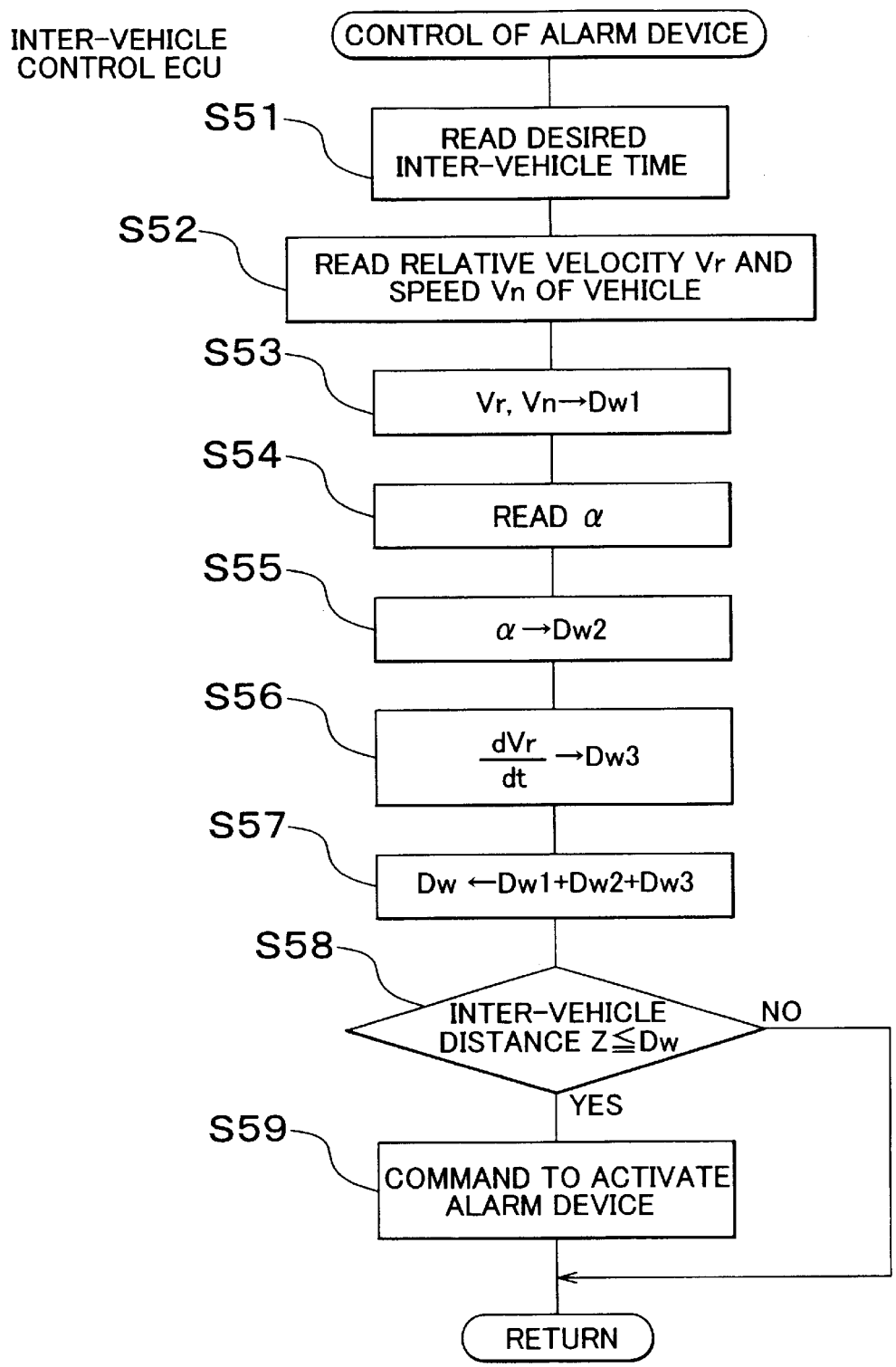
FIG. 7 is a flowchart indicating an alarm device control program stored in the ROM of the inter-vehicle control ECU.

An alarm control program as illustrated in the flowchart of FIG. 7 is executed at predetermined time intervals.

Figure 10:
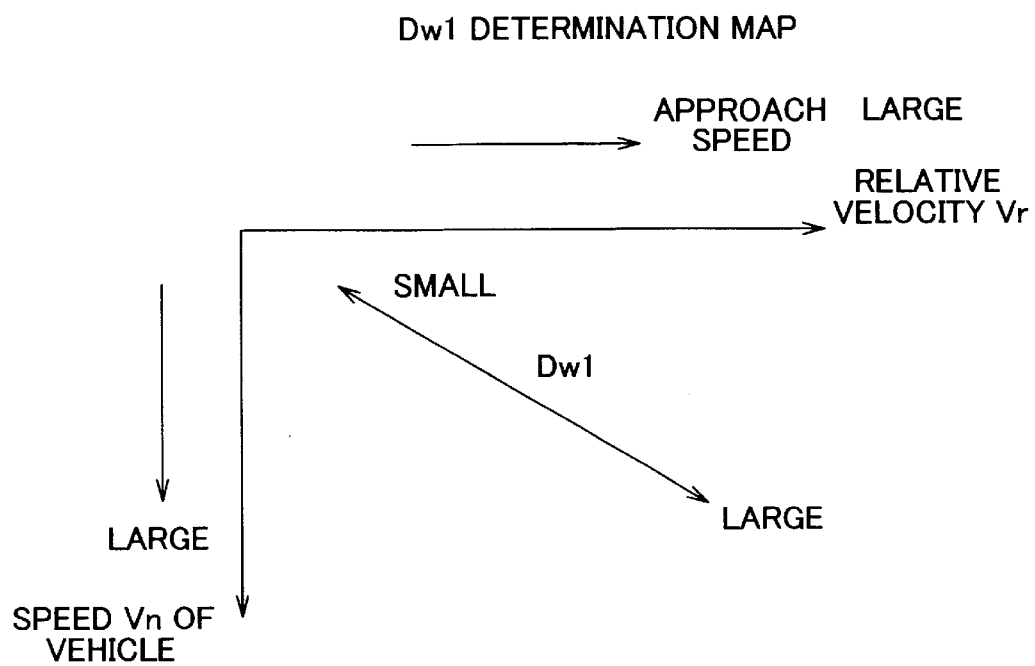
FIG. 10 is a map representing a table for determining a first approach distance, which table is stored in the ROM of the inter-vehicle control ECU.

In steps S51, S52 and S53, a first approach distance Dw1 is determined according to a table as represented by the map of FIG. 10, based on the desired inter-vehicle time T*, relative velocity Vr, and the speed Vn of the vehicle. In this case, a plurality of tables such as that of FIG. 10 are prepared for respective inter-vehicle times T*, and one of the tables that corresponds to the currently requested inter-vehicle time T* is selected. The first approach distance Dw1 is then determined based on the relative velocity Vr and the speed Vn of the vehicle with reference to the selected table. The approach distance (Dw1) is increased with increases in the approach speed Vr and the speed Vn of the vehicle, as shown in FIG. 10. Also, the approach distance (Dw1) is increased with an increase in the desired inter-vehicle time T*.

Figure 11:
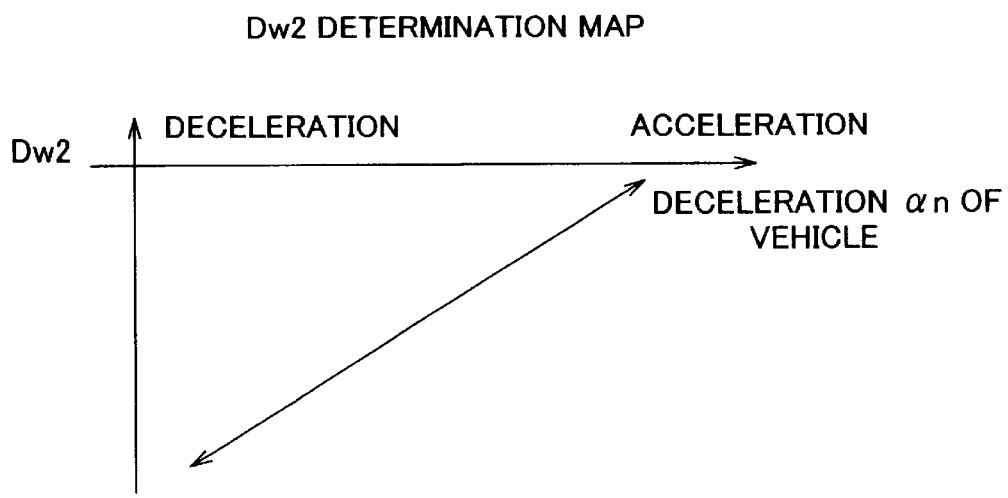
FIG. 11 is a map representing a table for determining a second approach distance, which table is stored in the ROM of the inter-vehicle control ECU.

In steps S54 and S55, a second approach distance Dw2 is determined based on the deceleration $\alpha n$ of the vehicle, according to a table as represented by the map of FIG. 11. As is understood from FIG. 11, the second approach distance Dw2 is set to a smaller value (which is a negative value and whose absolute value is larger) as the deceleration $\alpha n$ of the vehicle becomes larger. When the deceleration $\alpha n$ of the vehicle is relatively large, the driver has an increased sense of safety, and therefore the approach distance Dw can be reduced so as to delay the timing of alarm activation.

Figure 12:
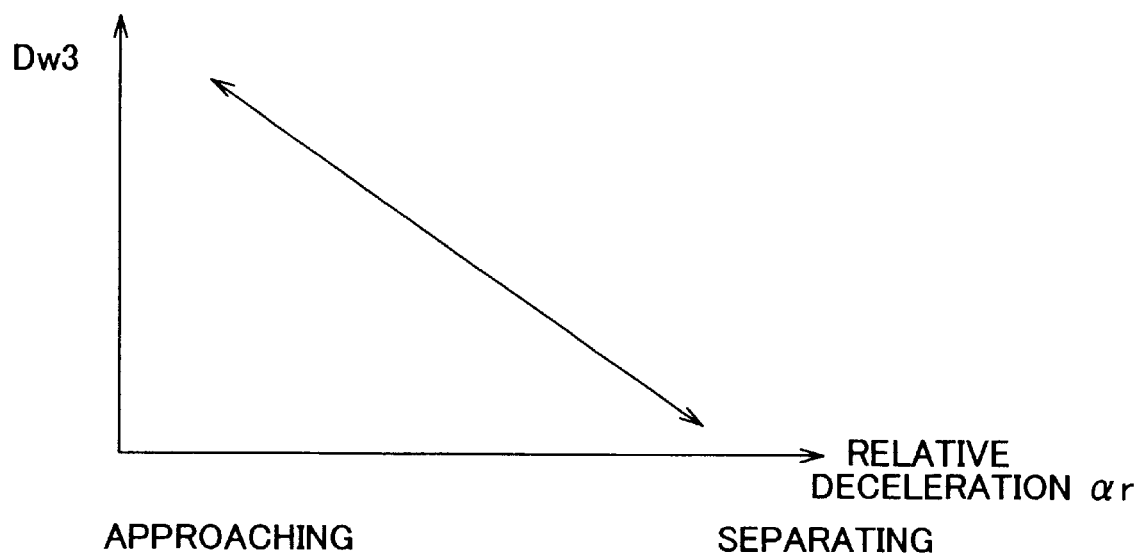
FIG. 12 is a map representing a table for determining a third approach distance, which table is stored in the ROM of the inter-vehicle control ECU.

In step S56, a third approach distance Dw3 is determined based on the relative deceleration $\alpha r$ (dVr/dt), according to a table as represented by the map of FIG. 12. The third approach distance Dw3 is made smaller in the case where the vehicle is more likely to be separated (spaced apart) from the object, than in the case where the vehicle is more likely to approach the object. When the vehicle is more likely to be separated from the object, namely, when the relative deceleration $\alpha r$ is relatively large, the approach distance is reduced as compared with the case where the relative deceleration is relatively small, thereby to delay the timing of alarm activation.

In step S57, the approach distance Dw is calculated as a sum of the first to third approach distance (i.e., Dw1+Dw2+Dw3). In step S58, it is determined whether the current inter-vehicle distance Z is smaller than the approach distance Dw. If the inter-vehicle distance Z is larger than the approach distance Dw, the alarm device 52 is not activated. If the inter-vehicle distance Z is equal to or smaller than the approach distance Dw, on the other hand, control proceeds to step S59 to prepare information representing a command to activate the alarm device 52, and transmit the information to the engine ECU 14.

The approach distance based on which the alarm device 52 is activated is determined as a value that is corrected based on the deceleration αn of the vehicle or the relative deceleration αr. Thus, the approach distance is determined taking account of the driver's sense of safety during deceleration and the actual state of the vehicle approaching the object. Consequently, the driver feels less confused or less embarrassed when an alarm is generated.

In the present embodiment, a command to activate the alarm device 52 is generated when the inter-vehicle distance Z becomes equal to or smaller than the approach distance Dw, irrespective of whether the object is in a stationary state or in a moving state (as in the case of the preceding vehicle).

The maps used upon determining the approach distance are not limited to those of the illustrated embodiment. For example, the maps may be multi-dimensional maps, or may be changed according to the result of learning. Also, the approach distance may be increased, for example, in a case where an abnormality is detected in the system. For example, the approach distance is increased when the actual deceleration is smaller by a set value or larger than the deceleration (target deceleration) that should be achieved by cruise control.

The approach distance Dw may also be obtained by multiplying the first approach distance Dw1 by a correction value determined based on the deceleration of the vehicle and/or a correction value determined based on the relative deceleration. The deceleration-based correction value is reduced with an increase in the deceleration of the vehicle, and the relative-deceleration-based correction value is reduced with an increase in the relative deceleration.

Figure 13:
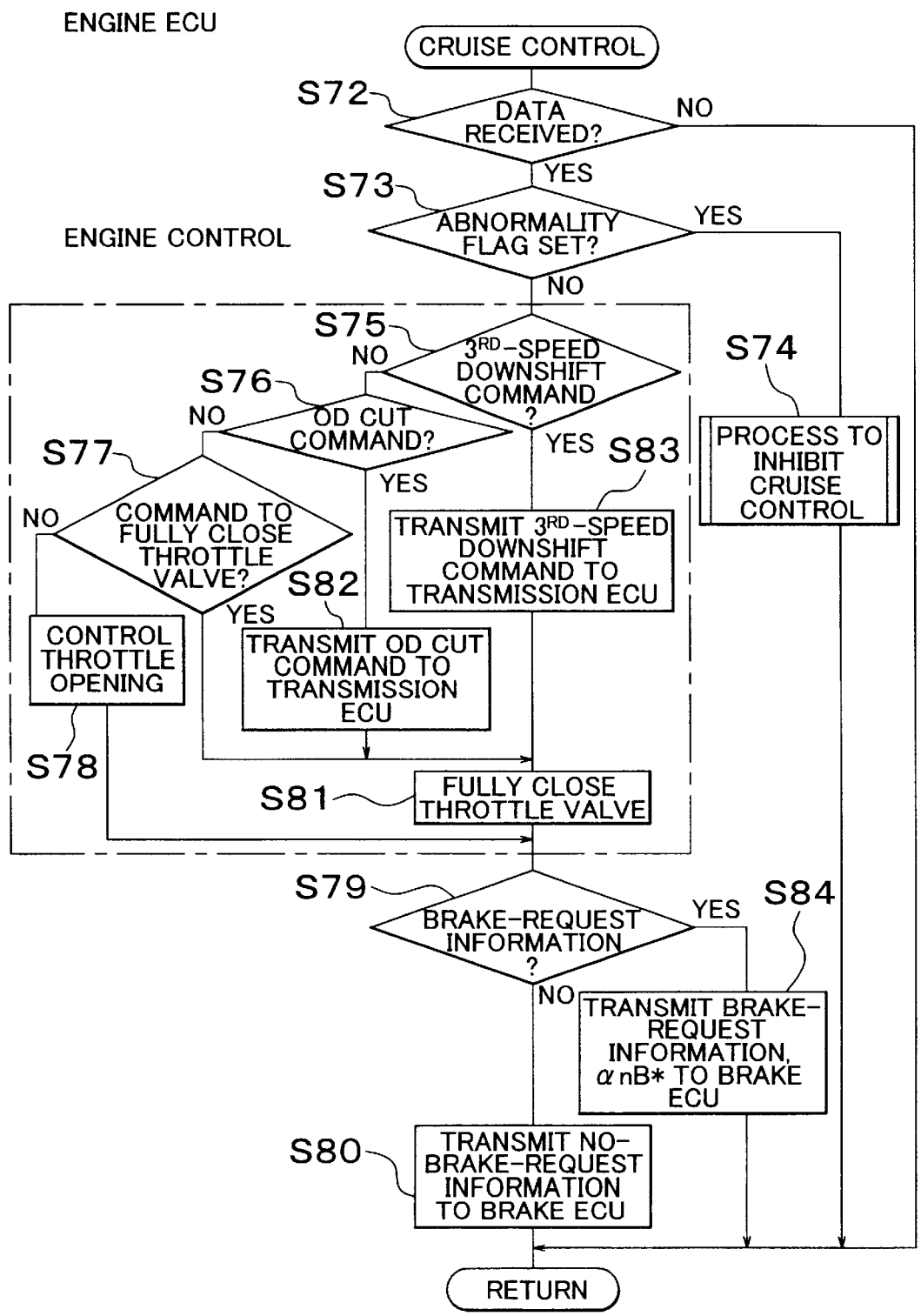
FIG. 13 is a flowchart illustrating a cruise control program stored in a ROM of the engine ECU.

The engine ECU 14 executes a cruise control program as illustrated in the flowchart of FIG. 13, at predetermined time intervals. The time intervals may be set to intervals at which information is transmitted from the inter-vehicle control ECU 12 to the engine ECU 14. The cruise control program of FIG. 13 may also be executed each time the engine ECU 14 receives information from the inter-vehicle control ECU 12.

In step S72, it is determined whether the engine ECU 14 has received information from the inter-vehicle ECU 12. If the information is received, control proceeds to step S73 to determine whether an abnormality flag (which will be described later) is in a set state. When the abnormality flag is in the set state, control proceeds to step S74 to inhibit cruise control. In this case, a predetermined operation to inhibit cruise control is carried out.

If the abnormality flag is in a reset state, step S75 and subsequent steps are executed to perform control of the engine, and the like, in accordance with engine control information. Under cruise control of this embodiment, the engine (and other components) is/are controlled without fail. Here, control performed before a start of a braking operation (actuation of brakes) will be described, but control performed after release of the brakes will not be described. After releasing of the brakes, the engine and other components are controlled in accordance with, for example, a command to permit speed-ratio normal control, a throttle control command, and the like.

It is determined in step S75 whether a command to shift the transmission down to the $3^{rd}$-speed position is received, and it is determined in step S76 whether a command to effectuate overdrive cut is received, while it is determined in step S77 whether a command to fully close the throttle valve is received. If negative decisions (NO) are obtained in all of these steps, control proceeds to step S78 to cause the throttle control device 36 to control the throttle opening amount so as to achieve the target deceleration αn* without changing the speed ratio. Namely, the throttle opening amount that can provide the target deceleration αn* is determined, and a command value corresponding to the thus determined throttle opening is generated to the throttle control device 36. In step S79, it is determined whether the information received by the engine ECU 14 includes brake-request information indicative of the presence of a request for braking. If the brake request information is not included, control proceeds to step S80 to transmit predetermined information, such as no-brake-request information, to the brake ECU 16. The predetermined information may include information to be used for detection of an abnormality as described later.

If the engine ECU 14 receives a command to fully close the throttle valve, an affirmative decision (YES) is obtained in step S77, and control proceeds to step S81 to control the throttle opening to zero. In this case, since brake-request information indicating the presence of a request for braking is normally not included in the information received by the engine ECU 14, a negative decision (NO) is obtained in step S79, and step S80 is executed to transmit no-brake-request information indicating the absence of a request for braking, and other information, to the brake ECU 16. If the engine ECU 14 receives an overdrive cut command, an affirmative decision (YES) is obtained in step S76, and control proceeds to step S82 to transmit an overdrive cut command to the transmission ECU 34. Furthermore, the throttle opening amount is controlled to zero in step S81, and no-brake-request information is transmitted to the brake ECU 16 in step S80. If the engine ECU 14 receives a command to shift the transmission down to the $3^{rd}$-speed position, an affirmative decision (YES) is obtained in step S75, and control proceeds to step S83 to transmit the $3^{rd}$-speed downshift command to the transmission control ECU 34. Then, control proceeds to step S81 to control the throttle opening to zero. If brake-request information indicating the presence of a brake request is not received by the engine ECU 14, step S80 is executed, as in the above cases, to transmit predetermined information to the brake ECU 16.

On the contrary, if brake-request information indicating the presence of a request for braking is received by the engine ECU 14, an affirmative decision (YES) is obtained in step S79, and step S84 is executed to transmit predetermined information to the brake ECU 16. The predetermined information may include, for example, brake-request information indicating the presence of a request for application of brakes and information representing the target deceleration αnB*.

Figure 14:
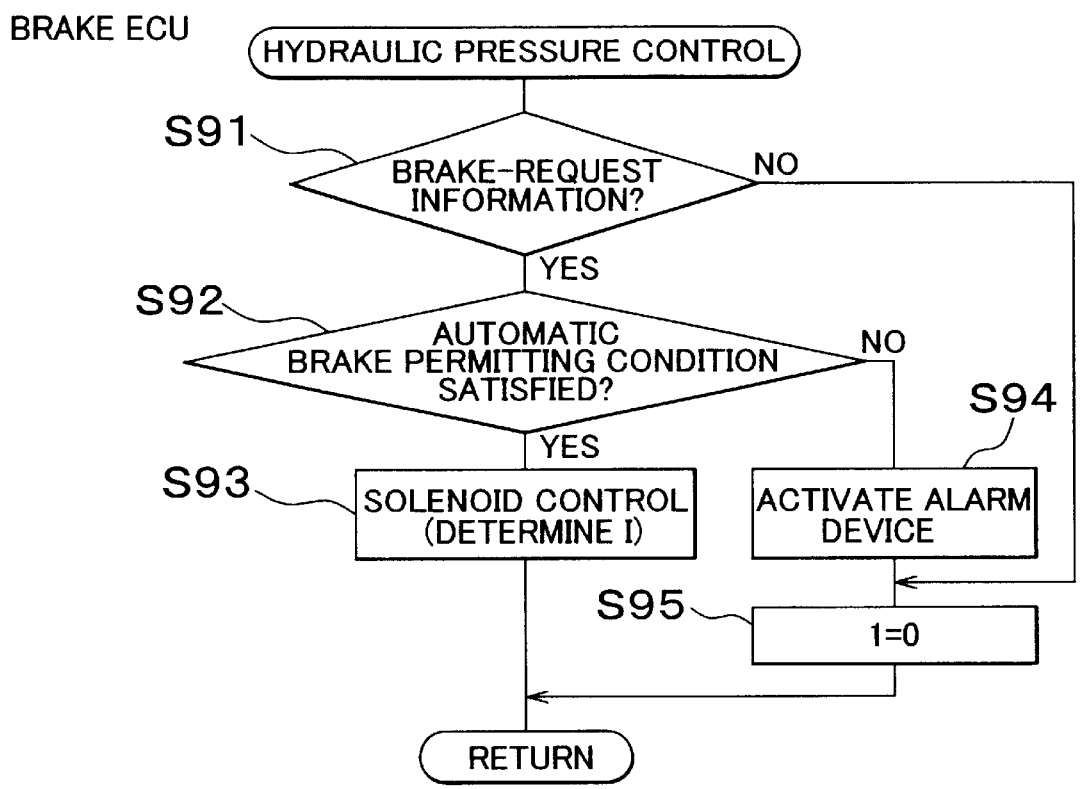
FIG. 14 is a flowchart illustrating a hydraulic pressure control program stored in a ROM of the brake ECU.

The brake ECU 16 executes a brake force (hydraulic pressure) control program as illustrated in the flowchart of FIG. 14, at predetermined time intervals.

In step S91, it is determined whether brake request information (indicating the presence of a brake request) has been received by the brake ECU 16. If an affirmative decision (YES) is obtained in step S91, control proceeds to step S92 to determine whether a condition for permitting application of an automatic brake is satisfied. The automatic brake permitting condition may be that (a) the temperature of a solenoid of the pressure control valve 50 is lower than a set temperature, or (b) a slip state of a wheel is more stable than a predetermined state. The automatic brake is inhibited from being applied if the application of the automatic brake results in deterioration or reduction in the running stability of the vehicle. The application of the automatic brake is also inhibited when it is undesirable for the brake apparatus 54 to continue its braking operation.

When the automatic brake permitting condition is satisfied, control proceeds to step S93 in which current I to be supplied to a coil 104 of the pressure control valve 50 is determined so as to achieve the target deceleration αnB* for brake control, and the brake hydraulic pressure is controlled to a level corresponding to the supply current I. As described above, the target deceleration αnB* for brake control is constant throughout one brake operation.

Figure 16:
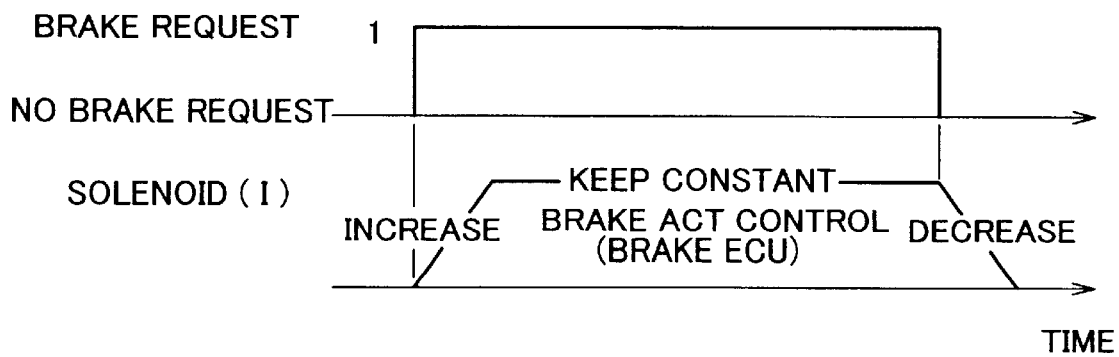
FIG. 16 is a view showing one example of control performed by the brake ECU.

As shown in FIG. 16, the current I supplied to the pressure control valve 50 is kept constant, and the brake pressure is kept at a value corresponding to the supply current I. When the target deceleration αnB* for brake control is constant, the supply current I is increased, then kept constant, and is then reduced in accordance with a predetermined pattern (for example, a trapezoidal pattern as shown in FIG. 16). If the target deceleration αnB* for brake control is thus made constant, brake control can be performed with high stability, and control hunting can be suppressed or prevented.

Furthermore, the deceleration is changed less frequently than in a conventional case, and therefore the driver feels less uncomfortable or unexpected about changes in the deceleration. In addition, the degree or magnitude of changes of the deceleration is reduced, thus assuring improved running stability of the vehicle and an improvement in the driver's sense of safety.

If the target deceleration is made constant, the current I supplied to the pressure control valve 50 and the brake pressure are also kept constant, and the brake pressure is controlled to a level that corresponds to the supply current I. With this arrangement, an abnormality or a failure in the brake apparatus 54 can be easily detected.

Furthermore, although it is difficult to set a guard value of a control command value (i.e., current I) applied to the pressure control valve 50 in the case where the target deceleration is changed, it becomes easy to set such a guard value when the target deceleration is constant.

When the automatic brake permitting condition is not satisfied, the alarm device 52 is activated in step S94, and the supply current I is made equal to zero in step S95. Thus, no control is performed on the brake hydraulic pressure. In the case where no-brake-request information (indicating the absence of a brake request) is received, too, the supply current I is made equal to zero.

Figure 15:
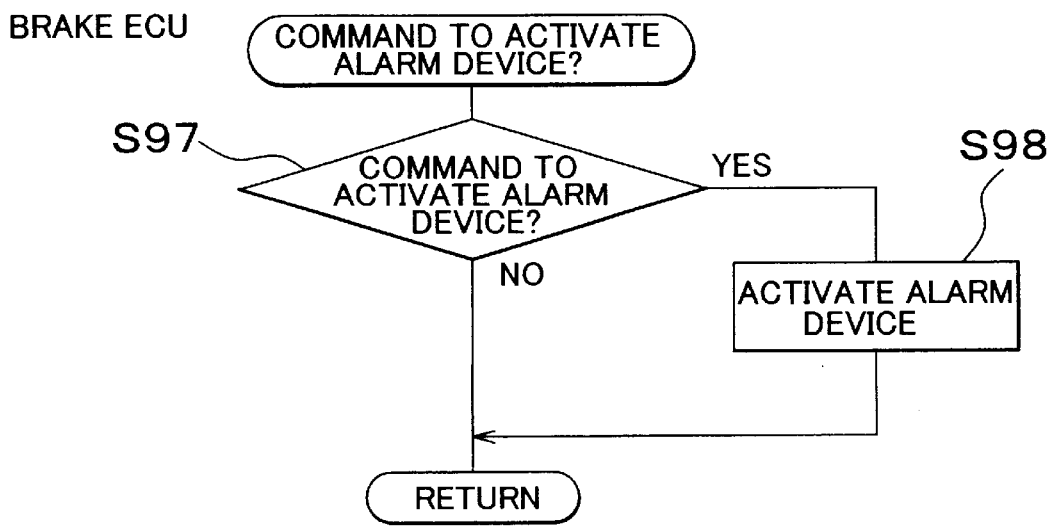
FIG. 15 is a flowchart illustrating an alarm device activation program stored in the ROM of the brake ECU.

An alarm device activation program as illustrated in the flowchart of FIG. 15 is executed at predetermined time intervals. In step S97, it is determined whether a command to activate the alarm device 52 is received by the brake ECU 16. If such a command is received, the alarm device 52 is activated in step S98, because the inter-vehicle distance Z becomes equal to or smaller than the approach distance Dw. In this case, since the alarm device 52 generates an alarm in such timing that is based on the deceleration of the vehicle and the actual state of the vehicle approaching the object, the driver feels less uncomfortable or less embarrassed by the alarm thus generated. The alarm device 52 is activated with no regard to the operating state of brakes.

As described above, the target deceleration is kept constant during application of brakes. However, if the deceleration of the vehicle becomes insufficient in the course of the braking operation, and the inter-vehicle distance between the vehicle and the preceding vehicle becomes short, an alarm is generated. Accordingly, the driver can perform an appropriate operation, such as depression of a brake pedal 60. It is thus effective to perform control of the alarm device 52 in combination with control for keeping the target deceleration constant during a braking operation.

It is to be understood that the alarm device 52 may be activated by an interrupt control routine. Namely, when a command to activate the alarm device is received by the brake ECU 16, step S98 of FIG. 15 is executed immediately.

In the illustrated embodiment, the laser radar device 20 functions to determine the same-lane probability, and the inter-vehicle control ECU 12, the engine ECU 14, the transmission ECU 34, the throttle control device 36, the brake ECU 16, the brake control actuator 50 and other components constitute a deceleration device (or braking system). Also, a portion of the brake ECU 16 that stores and executes step S92 of FIG. 14 functions to permit/inhibit brake operation.

A portion of the inter-vehicle control ECU 12 that stores step S30 of FIG. 6 functions to determine the target deceleration, and a portion of the brake ECU 16 that executes step S93 of FIG. 14, the brake control actuator 50 and other components constitute a deceleration controller. In this embodiment, the deceleration controller corresponds to a brake controller.

A portion of the inter-vehicle ECU 12 that stores and executes steps S51–S53 of FIG. 7, a portion of the inter-vehicle ECU 12 that stores the table as represented by the map of FIG. 10, and other components function to determine the tentative set-distance, and a portion of the inter-vehicle ECU 12 that stores and executes steps S54–S57 of FIG. 7, a portion of the inter-vehicle ECU 12 that stores the tables as represented by the maps of FIGS. 11 and 12, and other components function to determine the final set-distance.

Next, detection of abnormalities will be described. Abnormalities that arise in the system include abnormalities of respective elements, communications abnormalities, control abnormalities, and the like. In any case, when an abnormality is detected, cruise control is inhibited. The abnormalities of the constituent elements correspond to abnormalities of various sensors, the throttle opening control actuator, the brake control actuator, and other elements. These abnormalities are detected at the time of an initial check, which will not be described herein.

The communications abnormalities include the following cases: (1) information is not received at predetermined time intervals, (2) when the received information contains continuous or serial information, the continuity is not secured, and (3) the received information and its reversed information resulting from a mirror check are not in a reverse relationship with each other.

The control abnormalities occur due to false operations or unsuccessful operations of computers, control actuators, or the like, or communication errors. In the present embodiment, the control abnormalities are detected based on whether the contents of two or more pieces of information have logical consistency (i.e., whether there are logical errors or abnormalities).

More specifically, at least one of the two or more pieces of information may be control information (for example, engine control information, information representing the presence of a brake request, and information representing the target deceleration). The engine ECU 14 and the brake ECU 16 are operated in accordance with the control information received from the inter-vehicle control ECU 12. Also, at least one of the two or more pieces of information may be vehicle condition information representing, for example, detected values obtained by various sensors, and the operating state of the cruise control switch 26. The above-described vehicle information for cruise control is one example of the vehicle condition information. It is thus possible to acquire information representing the actual result of control, and information that provides the basis for producing the control information. Since the control information is transmitted between the ECUs through communication lines, the control information may also be called communication information. The vehicle condition information includes information that is transmitted to another ECU through communications, and information that is not transmitted to another ECU, and the transmitted information may be considered as communication information.

The control abnormalities are detected in the following cases: (1) where two or more of a plurality of pieces of communication information received do not have logical consistency, (2) communication information that is transmitted from the ECU in question to another ECU and communication information that is returned from the other ECU do not have logical consistency, (3) communication information received by the ECU in question and information produced by the same ECU or detection values of sensors, or the like, connected to the same ECU, do not have logical consistency.

A program for detecting communication abnormalities is executed by each ECU at predetermined time intervals, or each time information is transmitted, for example.

Figure 17:
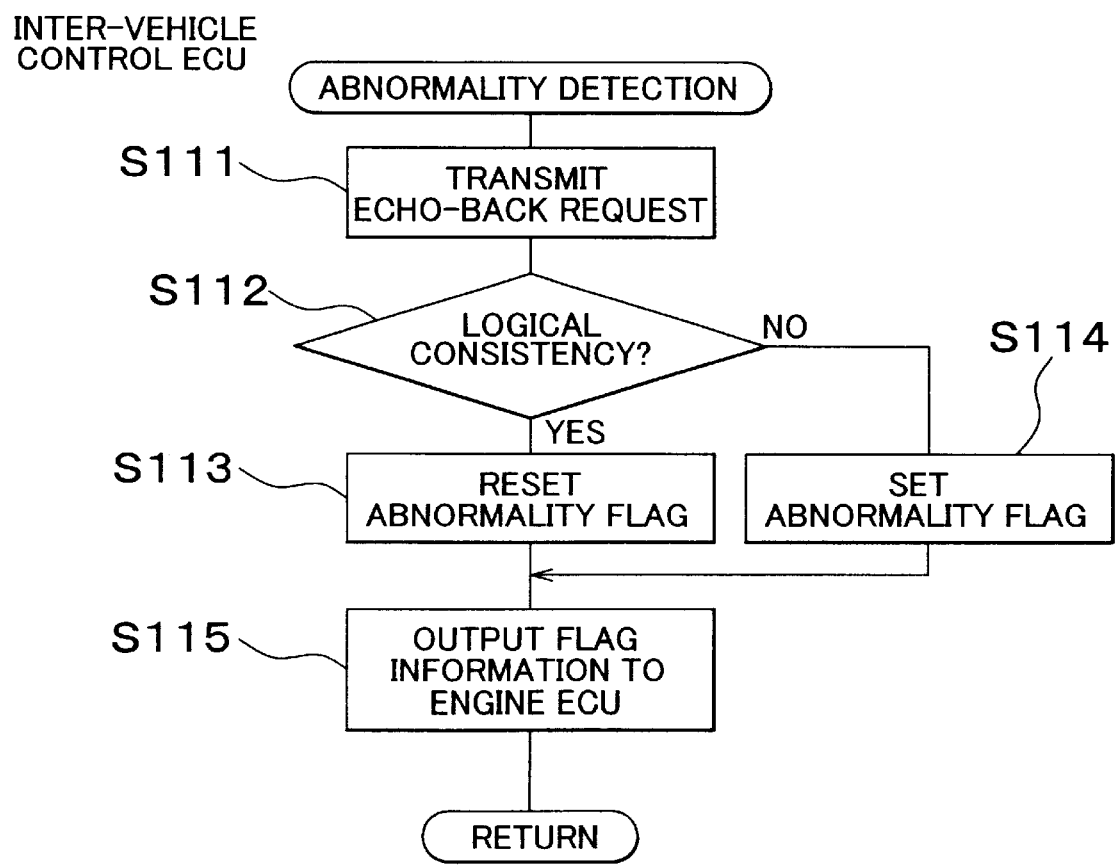
FIG. 17 is a flowchart illustrating an abnormality detection program stored in the ROM of the inter-vehicle control ECU.

For example, the inter-vehicle control ECU 12 executes an abnormality detection program as illustrated in the flowchart of FIG. 17, each time the ECU 12 transmits communication information to the engine ECU 14. In step S111, an echo-back request is transmitted from the inter-vehicle control ECU 12 to the engine ECU 14. In step S112, it is determined whether information transmitted from the inter-vehicle control ECU 12 to the engine ECU 14 and information returned to the inter-vehicle control ECU 12 have logical consistency. For example, when brake-request information indicating the presence of a brake request is transmitted, and no-brake-control information indicating the absence of a brake request is included in the returned or echo-back information, it is determined that there is no logical consistency between these pieces of information.

When the two or more pieces of information have logical consistency, an abnormality flag is reset in step S113. If there is no logical consistency, the abnormality flag is set in step S114. Then, in step S115, information indicative of the state of the abnormality flag is transmitted to the engine ECU 14.

It is also possible to detect an abnormality in the receiving state of information that is returned from the engine ECU 14 and is received by the inter-vehicle control ECU 12.

Meanwhile, the engine ECU 14 is adapted to detect an abnormality in communications with the inter-vehicle control ECU 12, and detect an abnormality in communications with the brake ECU 16.

Figure 18:
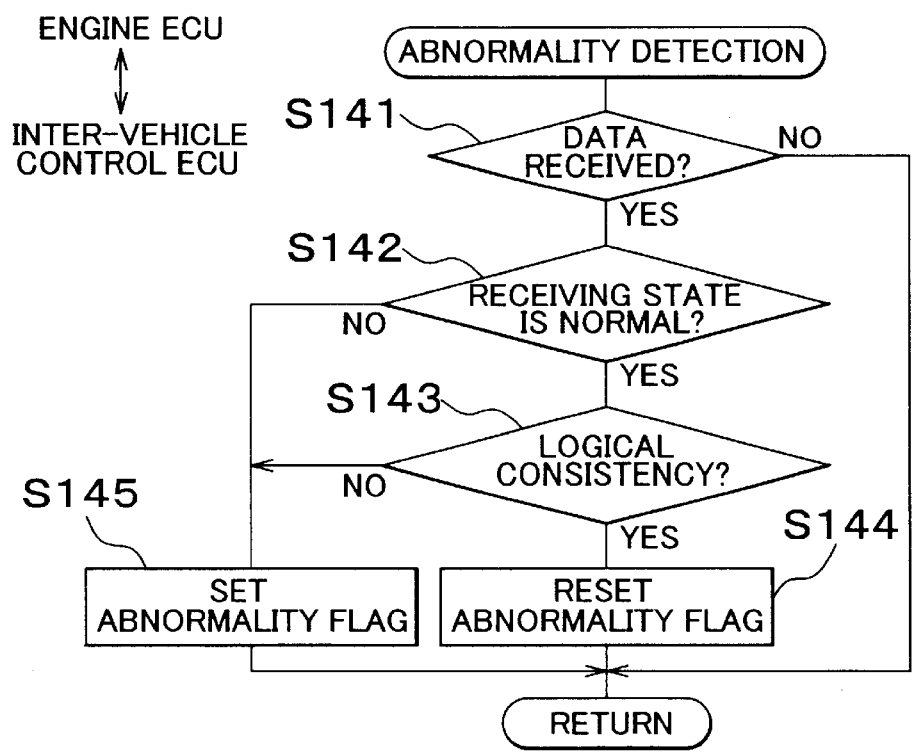
FIG. 18 is a flowchart illustrating an abnormality detection program stored in the ROM of the engine ECU.

For communications between the engine ECU 14 and the inter-vehicle control ECU 12, it is determined in step S141 in the flowchart shown in FIG. 18 whether the engine ECU 14 has received communication information from the inter-vehicle control ECU 12. If the information is received, control proceeds to step S142 to determine whether the receiving state is normal. Then, in step S143, it is determined whether there is logical consistency in the received information. For example, when the received information contains brake-request information indicating the presence of a brake request and a target deceleration $\alpha nB^*$ for braking that assumes a positive value, it is determined that there is logical consistency if the received information contains a target deceleration $\alpha n^*$ as a positive value and a $3^{rd}$-speed downshift command, and the accelerator operating amount detected by the engine ECU 14 is equal to zero. To the contrary, it is determined that there is no logical consistency when the received information contains brake-request information indicating the presence of a brake request, but the accelerator pedal is operated by a large amount or the cruise switch 26 is placed in the OFF position, for example. When there is logical consistency, control proceeds to step S144 to reset an abnormality flag. If there is no logical consistency, control proceeds to step S145 to set the abnormality flag. The abnormality detection program may be executed each time information is received. In this case, step S142 and subsequent steps are executed when information is received.

Figure 19:
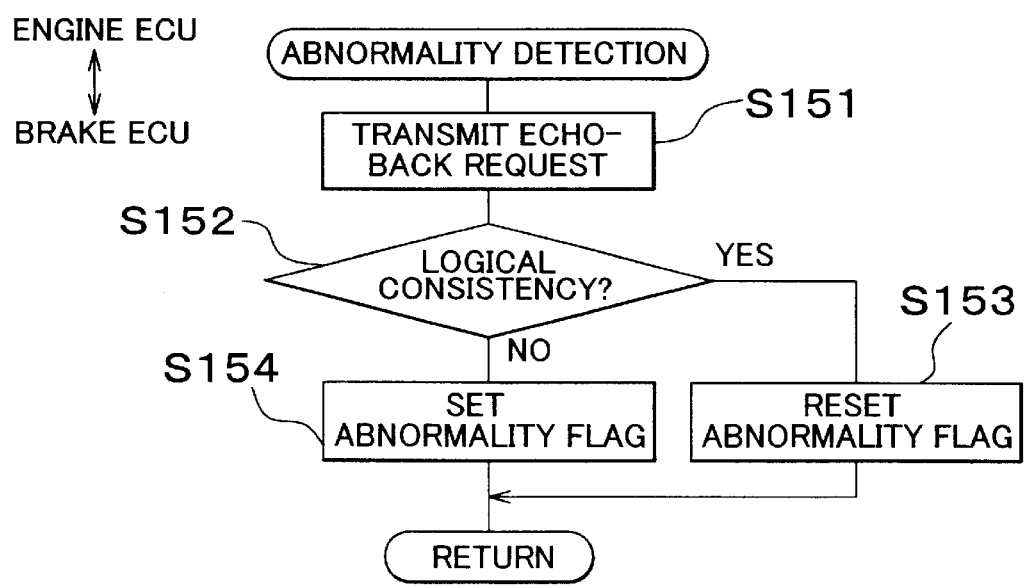
FIG. 19 is a flowchart illustrating an abnormality detection program stored in the ROM of the engine ECU.

In communications between the engine ECU 14 and the brake ECU 16, an abnormality detection program as illustrated in the flowchart shown in FIG. 19 is started with step S151 in which the engine ECU 14 transmits information representing the presence of a brake request to the brake ECU 16, and then transmits an echo-back request to the brake ECU 16. In step S152, it is determined whether the transmitted information and the received information have logical consistency. For example, if the transmitted information contains brake-request information indicating the presence of a brake request, but the received information contains no-brake-request information indicating the absence of a brake request, it is determined that there is no logical consistency. If there is logical consistency, control proceeds to step S153 to reset an abnormality flag. If there is no logical consistency, control proceeds to step S154 to set the abnormality flag.

In the above-described abnormality detection program, the engine ECU 14 may also request particular information produced by the brake ECU 16, instead of transmitting the echo-back request. For example, it may be determined whether particular information transmitted from the brake ECU 16 and at least one of information transmitted from the engine ECU 14 to the brake ECU 16 and information produced by the engine ECU 14 have logical consistency. If a brake operation flag produced by the brake ECU 16 and indicating that brakes are being actuated is in a set (ON) state, and the engine ECU 14 transmits brake-request information indicating the presence of a brake request to the brake ECU 16, it is determined that there is logical consistency between these pieces of information. On the contrary, if the engine ECU 14 transmits brake-request information indicating the presence of a brake request to the brake ECU 16 with the cruise control switch 26 being placed in the ON state, but the brake operation flag transmitted from the brake ECU 16 is in a reset (OFF) state, it is determined that there is no logical consistency. In this case, it is determined whether there is logical consistency between at least one of information produced by the ECU in question and information detected by the ECU, and communication information other than control information (control command value) transmitted from the other ECU.

Figure 20:
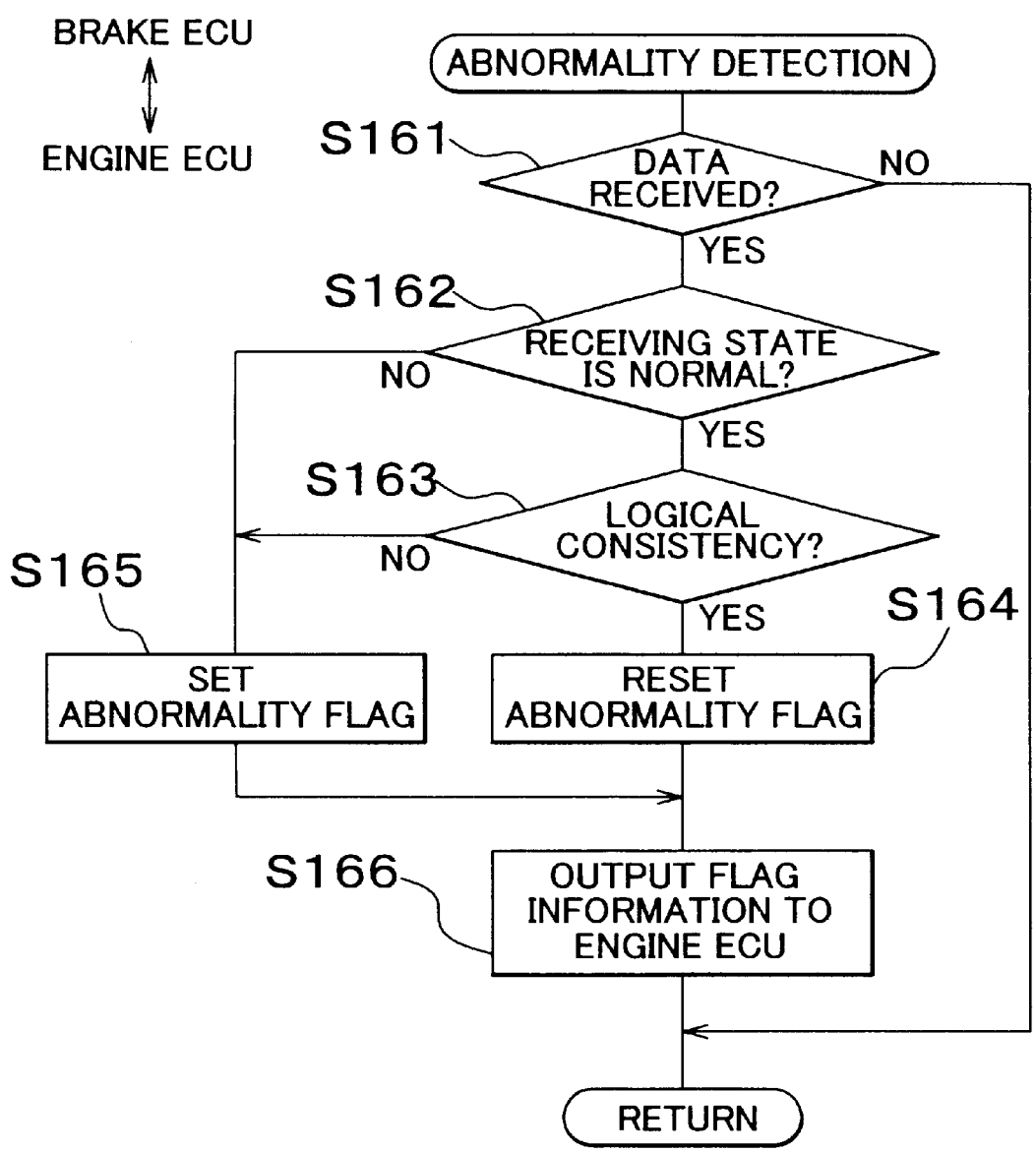
FIG. 20 is a flowchart illustrating an abnormality detection program stored in the ROM of the engine ECU.

The brake ECU 16 also executes an abnormality detection program as illustrated in the flowchart of FIG. 20. In step S161, it is determined whether information is received by the brake ECU 16. In step S162, it is determined whether the information receiving state is normal. In step S163, it is determined whether there is logical consistency between two or more pieces of received information. For example, if the received information contains brake-request information indicating the presence of a brake request and information indicating a target deceleration $\alpha nB^*$ for braking that assumes a positive value, there is logical consistency between these pieces of information. The abnormality flag is reset in step S164, or set in step S165, based upon whether any abnormality is detected. In step S166, the state of an abnormality flag is transmitted to the engine ECU 14.

In the present embodiment as described above, control abnormalities, as well as abnormalities of elements and communication abnormalities as detected in the known system, can be detected. This arrangement can increase the chance of detecting abnormalities. Furthermore, the embodiment makes it possible to detect the control abnormalities in the early stage, and to prevent the brake control or the engine control from being performed by mistake, thus assuring improved reliability of the system.

Also, it is effective to enable detection of control abnormalities in the system development stage. If it is determined that there is no logical consistency between two or more pieces of information in the development stage, there is a possibility that an abnormality is present in a control program. In accordance with this result, the control program may be studied and modified as needed. In this case, it is desirable to detect the presence of logical consistency between information including two or more pieces of communication information. It is thus possible to detect an abnormality by comparing information produced by the ECU in question with information produced by another ECU.

When a control abnormality is detected, only brake control may be inhibited while control of the engine and other components may be allowed. This is because the brake control suffers from a greater influence of a control abnormality on the vehicle running state. Also, it is possible to detect a control abnormality by utilizing communication information between the engine ECU 14 and the transmission ECU 34.

The mode of the cruise control is not limited to that of the illustrated embodiment. For example, similar control may be performed on the engine, and the like, before application of brakes and after releasing of the brakes. In either case, the engine and other components are controlled based on at least one of the deceleration deviation and the target deceleration. Also, the threshold value, or the like, may be set to the same value.

The running control apparatus is not necessarily constructed as a system including a plurality of ECUs, but may be constructed as a system having a single ECU.

The structure of a brake circuit is not limited to that of the illustrated embodiment. Any brake structure may be employed provided that an automatic brake can be applied, and it is not essential that antilock control or vehicle behavior (stability) control can be performed.

Also, the brake 62 is not limited to a hydraulic brake, but may be an electromechanical brake in which a friction member is pressed against a brake rotor by an electric motor. Furthermore, the driving apparatus of the vehicle may include an internal combustion engine and an electric motor, or may include only an electric motor without including an engine. In these cases, when there is a low necessity to decelerate the vehicle, the operating state of the electric motor included in the driving apparatus may be controlled. The vehicle is not limited to a vehicle driven by the engine, but may be a hybrid vehicle or an electric vehicle. The braking can include regenerative braking in which charging of a battery by an electric motor/generator is performed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An alarm device that generates an alarm when a distance between a vehicle and an object that exists in a set region in front of the vehicle is smaller than a set distance, comprising a controller that:
   determines a tentative set distance based on at least one of a running speed of the vehicle and a relative velocity between the vehicle and the object;
   determines a relative running deceleration between the vehicle and the object based on a change in a relative position between the vehicle and the object; and
   corrects the determined tentative set distance, based on at least one of a running deceleration condition of the vehicle and the relative running deceleration between the object and the vehicle, so as to determine a final set distance.

2. The alarm device according to claim 1, wherein the controller sets a correction value used for correcting the determined tentative set distance, to a smaller value, as the running deceleration condition indicates that a deceleration of the vehicle increases.

3. The alarm device according to claim 2, wherein the controller determines at least one of the tentative set-distance and the final set-distance taking account of a relative positional relationship between the vehicle and the object, which relationship is requested by a vehicle operator.

4. The alarm device according to claim 1, wherein the controller determines at least one of the tentative set-distance and the final set-distance taking account of a relative positional relationship between the vehicle and the object, which relationship is requested by a vehicle operator.

5. The alarm device according to claim 1, wherein the controller determines at least one of the tentative set-distance and the final set-distance with reference to at least one map.

6. A running control apparatus, comprising:
   an alarm device as defined in claim 1; and
   a running controller that controls a running state of the subject vehicle based on a relative positional relationship between the vehicle and the object.

7. The running control apparatus according to claim 6, wherein the running controller performs cruise control that controls the running state of the vehicle so that the vehicle and a preceding vehicle as the object are kept in a relative relationship that is requested by a vehicle operator.

8. The running control apparatus according to claim 6, wherein the running controller performs deceleration control that decelerates the vehicle by applying a brake so as to restrain rotation of a wheel of the vehicle.

9. An alarm device that generates an alarm when a distance between a vehicle and an object that exists in a set region in front of the vehicle is smaller than a set distance, comprising a controller that:
   determines a tentative set distance based on at least one of a running speed of the vehicle and a relative velocity between the vehicle and the object;
   determines a relative running deceleration between the vehicle and the object based on a change in a relative position between the vehicle and the object; and
   corrects the determined tentative set distance, based on at least the relative running deceleration between the vehicle and the object, so as to determine a final set distance.

10. The alarm device according to claim 9, wherein the controller determines the final set distance by correcting the determined tentative set distance based on both a deceleration of the vehicle and the relative deceleration between the vehicle and the object.

11. The alarm device according to claim 9, wherein the controller sets a correction value for correcting the determined tentative set distance, to a smaller value, as a tendency of the vehicle to be separated from the object becomes stronger.

12. The alarm device according to claim 9, wherein the controller determines at least one of the tentative set-distance and the final set-distance with reference to at least one map.

13. A running control apparatus, comprising:
   an alarm device as defined in claim 9; and
   a running controller that controls a running state of the vehicle based on a relative positional relationship between the vehicle and the object.

14. The running control apparatus according to claim 13, wherein the running controller performs cruise control that controls the running state of the vehicle so that the vehicle and a preceding vehicle as the object are kept in a relative relationship that is requested by a vehicle operator.

15. The running control apparatus according to claim 13, wherein the running controller performs deceleration control that decelerates the vehicle by applying a brake so as to restrain rotation of a wheel of the vehicle.

16. An alarm device that generates an alarm when a distance between a vehicle and an object that exists in a set region in front of the vehicle is smaller than a set distance, comprising:
   a controller that determines a relative running deceleration between the vehicle and the object based on a change in a relative position between the vehicle and the object, and the set distance based on (a) at least one of a running speed of the vehicle and a relative velocity between the vehicle and the object, (b) a running deceleration of the vehicle, and (c) the relative running deceleration between the vehicle and the object.

17. An alarm device that generates an alarm when a distance between a vehicle and an object that exists in a set region in front of the vehicle is smaller than a set distance, comprising:
   a controller that determines a relative running deceleration between the vehicle and the object based on a change in a relative position between the vehicle and the object, and the set distance based on (a) at least one of a running speed of the vehicle and a relative velocity between the vehicle and the object, and (b) the relative running deceleration between the vehicle and the object.

18. An alarm device that generates an alarm when a relative positional relationship between a vehicle and an object that exists in a set region in front of the vehicle represents a tendency of the vehicle to approach the object as compared with a set relative positional relationship, comprising a controller that:
   determines a tentative set relative positional relationship based on at least one of a running speed of the vehicle and a relative velocity between the vehicle and the object; and
   corrects the determined tentative set relative positional relationship, based on at least one of a running deceleration of the vehicle and a relative running deceleration between the vehicle and the object, so as to determine a final set relative positional relationship.

19. The alarm device of claim 18, wherein the relative positional relationship comprises at least one of an inter-vehicle time, a relative velocity and a relative running deceleration between the vehicle and the object.

* * * * *